(12) United States Patent
Pelletier et al.

(10) Patent No.: US 10,012,067 B2
(45) Date of Patent: Jul. 3, 2018

(54) SYSTEM AND METHOD FOR DETERMINING TORSION USING AN OPTO-ANALYTICAL DEVICE

(75) Inventors: Michael T. Pelletier, Houston, TX (US); Robert P. Freese, Pittsboro, NC (US); Shilin Chen, Montgomery, TX (US)

(73) Assignee: Halliburton Energy Services, Inc., Houston, TX (US)

(*) Notice: Subject to any disclaimer, the term of this patent is extended or adjusted under 35 U.S.C. 154(b) by 610 days.

(21) Appl. No.: 14/424,743

(22) PCT Filed: Aug. 31, 2012

(86) PCT No.: PCT/US2012/053468
§ 371 (c)(1),
(2), (4) Date: Feb. 27, 2015

(87) PCT Pub. No.: WO2014/035425
PCT Pub. Date: Mar. 6, 2014

(65) Prior Publication Data
US 2015/0240617 A1    Aug. 27, 2015

(51) Int. Cl.
| | | |
|---|---|---|
| E21B 45/00 | (2006.01) | |
| E21B 3/00 | (2006.01) | |
| E21B 7/00 | (2006.01) | |
| E21B 10/42 | (2006.01) | |
| E21B 12/02 | (2006.01) | |

(Continued)

(52) U.S. Cl.
CPC ............ *E21B 45/00* (2013.01); *E21B 3/00* (2013.01); *E21B 7/00* (2013.01); *E21B 10/42* (2013.01); *E21B 12/02* (2013.01); *E21B 44/00* (2013.01); *E21B 47/122* (2013.01);

(Continued)

(58) Field of Classification Search
CPC ........ E21B 49/003; E21B 10/00; E21B 10/42; E21B 10/602; E21B 44/00; E21B 47/01; E21B 49/005; E21B 47/00; E21B 7/00; E21B 49/00; E21B 47/024; E21B 7/04; E21B 45/00; E21B 3/00; E21B 47/123; E21B 12/02; E21B 47/122; E21B 47/0905; E21B 47/02216; E21B 47/082;

(Continued)

(56) References Cited

U.S. PATENT DOCUMENTS

| | | |
|---|---|---|
| 3,579,775 A | 5/1971 | Carlson |
| 4,785,894 A | 11/1988 | David, Jr. et al. |

(Continued)

FOREIGN PATENT DOCUMENTS

| | | | |
|---|---|---|---|
| DE | 20105054 | 8/2001 | |
| DE | 102009047044 | 5/2011 | ............ G01B 11/26 |

(Continued)

OTHER PUBLICATIONS

International Search Report and Written Opinion, Application No. PCT/US2012/053470, 21 pages, dated Nov. 26, 2012.

(Continued)

*Primary Examiner* — Wei Wang
(74) *Attorney, Agent, or Firm* — Baker Botts L.L.P.

(57) ABSTRACT

In one embodiments, a method includes drilling a wellbore in a formation with a drilling tool. The method further includes receiving electromagnetic radiation using an opto-analytical device coupled to the drilling tool. The method also includes determining torsion associated with drilling the wellbore based on the received electromagnetic radiation.

21 Claims, 18 Drawing Sheets

(51) Int. Cl.
*E21B 44/00* (2006.01)
*E21B 47/12* (2012.01)
*E21B 49/00* (2006.01)
*G01L 3/14* (2006.01)

(52) U.S. Cl.
CPC ............ *E21B 47/123* (2013.01); *E21B 49/00* (2013.01); *E21B 49/005* (2013.01); *G01L 3/1421* (2013.01)

(58) Field of Classification Search
CPC .. G01V 8/10; G01V 2210/1216; G06F 19/00; G01H 9/00; G01L 3/1421; G01P 15/097; G01P 3/44
See application file for complete search history.

(56) References Cited

U.S. PATENT DOCUMENTS

| | | | |
|---|---|---|---|
| 5,510,285 | A | 4/1996 | Kim |
| 5,511,037 | A | 4/1996 | Randall et al. |
| 5,720,355 | A | 2/1998 | Lamine et al. |
| 5,887,668 | A | 3/1999 | Haugen et al. |
| 6,088,294 | A | 7/2000 | Leggett et al. |
| 6,176,323 | B1 | 1/2001 | Weirich et al. |
| 7,280,214 | B2 | 10/2007 | Difoggio et al. |
| 7,503,403 | B2 | 3/2009 | Jogi et al. |
| 7,533,572 | B2 | 5/2009 | Twerdochlib |
| 7,604,072 | B2 | 10/2009 | Pastusek et al. |
| 7,748,474 | B2 | 7/2010 | Watkins et al. |
| 7,752,906 | B2 | 7/2010 | Pop et al. |
| 7,775,099 | B2 | 8/2010 | Bogath et al. |
| 8,016,050 | B2 | 9/2011 | Teodorescu |
| 8,028,764 | B2 | 10/2011 | Teodorescu |
| 8,087,477 | B2 | 1/2012 | Sullivan et al. |
| 8,210,280 | B2 | 7/2012 | Trinh et al. |
| 8,220,540 | B2 | 7/2012 | Freyer |
| 8,245,793 | B2 | 8/2012 | Trinh et al. |
| 2001/0054514 | A1 | 12/2001 | Sullivan et al. |
| 2002/0186370 | A1 | 12/2002 | Roesner et al. |
| 2005/0034917 | A1 | 2/2005 | Mathiszik et al. |
| 2006/0175057 | A1 | 8/2006 | Mandal et al. |
| 2006/0175547 | A1 | 8/2006 | Difoggio et al. |
| 2006/0260845 | A1 | 11/2006 | Johnson |
| 2007/0272442 | A1 | 11/2007 | Pastusek et al. |
| 2008/0060846 | A1 | 3/2008 | Belcher et al. |
| 2008/0164063 | A1 | 7/2008 | Grayson et al. |
| 2009/0033933 | A1 | 2/2009 | Myrick et al. |
| 2009/0044977 | A1 | 2/2009 | Johnson et al. |
| 2009/0222209 | A1 | 9/2009 | Morys |
| 2010/0089645 | A1 | 4/2010 | Trinh et al. |
| 2010/0193246 | A1 | 8/2010 | Grayson et al. |
| 2010/0282510 | A1 | 11/2010 | Sullivan et al. |
| 2011/0147083 | A1 | 6/2011 | Mauldin et al. |
| 2011/0163891 | A1 | 7/2011 | Wilson et al. |
| 2011/0253448 | A1 | 10/2011 | Trinh et al. |
| 2011/0266054 | A1 | 11/2011 | Kumar et al. |
| 2012/0179378 | A1 | 7/2012 | Duncan et al. |
| 2014/0311803 | A1 | 10/2014 | Bittar et al. |

FOREIGN PATENT DOCUMENTS

| | | |
|---|---|---|
| EP | 0336477 | 10/1989 |
| GB | 2454699 | 5/2009 |
| WO | 03/104384 | 12/2003 |
| WO | 2008/034028 | 3/2008 |
| WO | 2010-129526 | 11/2010 |
| WO | 2012/166138 | 12/2012 |

OTHER PUBLICATIONS

International Search Report and Written Opinion, Application No. PCT/US2012/053466, 10 pages, dated Nov. 23, 2012.
International Search Report and Written Opinion, Application No. PCT/US2012/053463, 22 pages, dated Nov. 26, 2012.
International Search Report and Written Opinion, Application No. PCT/US2012/053465, 8 pages, dated Dec. 7, 2012.
International Search Report and Written Opinion, Application No. PCT/ US2012/053468, 17 pages, dated Dec. 26, 2012.
International Search Report and Written Opinion, Application No. PCT/US2012/053474, 13 pages, dated Nov. 26, 2012.
International Search Report and Written Opinion, Application No. PCT/US2012/053459, 8 pages, dated Jan. 17, 2013.
Chen, Shilin, "Linear and Nonlinear Dynamics of Drillstrings," Chapter 7, Ph.D. thesis; 164 pages, 1994-1995.
International Preliminary Report on Patentability issued in PCT/US2012/053463; 8 pages, dated Mar. 3, 2015.
International Preliminary Report on Patentability issued in PCT/US2012/053465; 6 pages, dated Mar. 3, 2015.
International Preliminary Report on Patentability issued in PCT/US2012/053466; 8 pages, dated Mar. 3, 2015.
International Preliminary Report on Patentability issued in PCT/US2012/053468; 7 pages, dated Mar. 3, 2015.
International Preliminary Report on Patentability issued in PCT/US2012/053470; 7 pages, dated Mar. 3, 2015.
International Preliminary Report on Patentability issued in PCT/US2012/053474; 6 pages, dated Mar. 3, 2015.
International Preliminary Report on Patentability issued in PCT/US2012/053459; 6 pages, dated Mar. 3, 2015.
Canadian Office Action, Application No. 2883525; 4 pages, dated Mar. 17, 2016.
Canadian Office Action, Application No. 2883243; 4 pages, dated Mar. 21, 2016.
Extended European Search Report, Application No. 12883815.8; 8 pages, dated Feb. 17, 2016.
Canadian Office Action, Application No. 2883250; 6 pages, dated Feb. 15, 2016.
Canadian Office Action, Application No. 2883522; 6 pages, dated May 3, 2016.
Canadian Office Action, Application No. 2883529; 4 pages, dated Mar. 30, 2016.
Canadian Office Action, Application No. 2883247; 6 pages, dated Apr. 29, 2016.
Extended European Search Report, Application No. 12883731.7; 6 pages, dated May 20, 2016.
International Preliminary Report on Patentability issued in PCT/US2012/053463; 9 pages, dated Mar. 12, 2015.
International Preliminary Report on Patentability issued in PCT/US2012/053465; 7 pages, dated Mar. 12, 2015.
International Preliminary Report on Patentability issued in PCT/US2012/053466; 9 pages, dated Mar. 12, 2015.
International Preliminary Report on Patentability issued in PCT/US2012/053468; 8 pages, dated Mar. 12, 2015.
International Preliminary Report on Patentability issued in PCT/US2012/053470; 8 pages, dated Mar. 12, 2015.
International Preliminary Report on Patentability issued in PCT/US2012/053474; 7 pages, dated Mar. 12, 2015.
International Preliminary Report on Patentability issued in PCT/US2012/053459; 7 pages, dated Mar. 12, 2015.
Canadian Office Action, Application No. 2883253; 4 pages, dated May 6, 2016.
Canadian Office Action, Application No. 2883250; 4 pages, dated Nov. 22, 2016.
Extended European Search Report, Application No. 12883539.4; 6 pages, dated Jun. 13, 2006.
Extended European Search Report, Application No. 12883526.1; 7 pages, dated Jun. 20, 2016.
Extended European Search Report, Application No. 12883705.1; 7 pages, dated Jun. 21, 2016.
Extended European Search Report, Application No. 12883698.8; 6 pages, dated Jun. 27, 2016.
Extended European Search Report, Application No. 12883611.1; 7 pages, dated Jul. 7, 2016.
Canadian Office Action, Application No. 2883243; 4 pages, dated Jan. 26, 2017.
Canadian Office Action, Application No. 2883529; 4 pages, dated Mar. 27, 2017.

(56) References Cited

OTHER PUBLICATIONS

Canadian Office Action, Application No. 2883525; 3 pages, dated Jun. 6, 2017.
Canadian Office Action, Application No. 2883253; 4 pages, dated May 29, 2017.

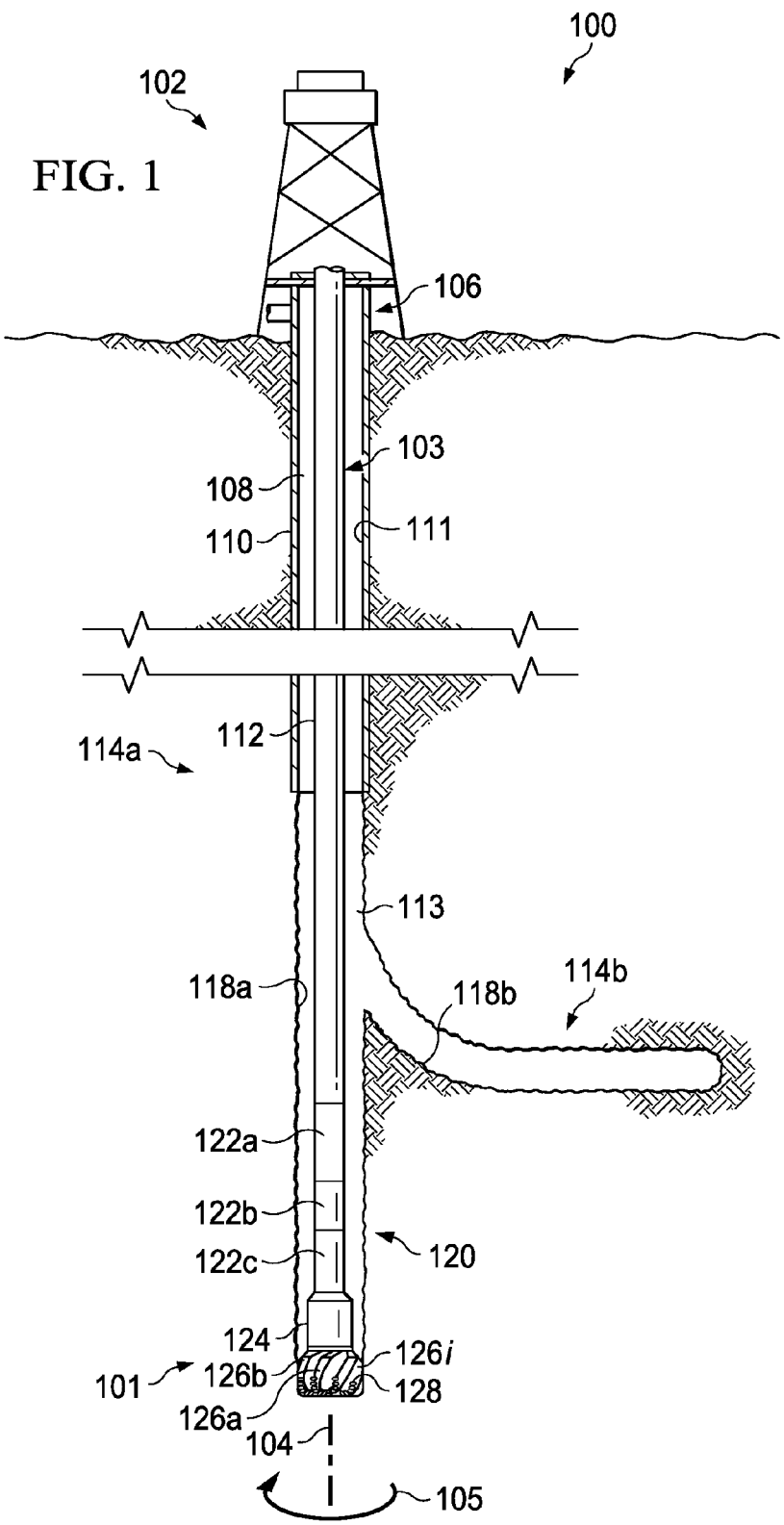

SYSTEM AND METHOD FOR DETERMINING TORSION USING AN OPTO-ANALYTICAL DEVICE

RELATED APPLICATIONS

This application is a U.S. National Stage Application of International Application No. PCT/US2012/053468 Aug. 31, 2012, which designates the United States, and which is incorporated herein by reference in its entirety.

TECHNICAL FIELD

The present disclosure relates generally to downhole drilling tools and, more particularly, to a system and method for determining torsion in a drilling tool using an opto-analytical device.

BACKGROUND

Various types of downhole drilling tools including, but not limited to, rotary drill bits, reamers, core bits, and other downhole tools have been used to form wellbores in associated downhole formations. Examples of such rotary drill bits include, but are not limited to, fixed cutter drill bits, drag bits, polycrystalline diamond compact (PDC) drill bits, and matrix drill bits associated with forming oil and gas wells extending through one or more downhole formations. Fixed cutter drill bits such as a PDC bit may include multiple blades that each include multiple cutting elements.

In typical drilling applications, a PDC bit may be used to drill through various levels or types of geological formations with longer bit life than non-PDC bits. Typical formations may generally have a relatively low compressive strength in the upper portions (e.g., shallower drilling depths) of the formation and a relatively high compressive strength in the lower portions (e.g., deeper drilling depths) of the formation.

One or more drilling characteristics may affect the process of drilling in a formation. These drilling characteristics may include properties of the formation itself (e.g., porosity, plasticity, density, rock strength, rock type and composition (e.g. shale, sandstone, limestone, etc.)), changes in the formation being drilled, the presence of types of fluids in the formation, the presence of brines in the formation, the presence of hydrocarbons (e.g., oil, natural gas) in the formation, changes in concentration of gases as the formation is being drilled, temperatures of components of the drilling tool, vibration of the drilling tool and drill string, torsion, cutting element wear, depth of cut control, cutting sizes, etc.

SUMMARY

In one embodiments, a method includes drilling a wellbore in a formation with a drilling tool. The method further includes receiving electromagnetic radiation using an opto-analytical device coupled to the drilling tool. The method also includes determining torsion associated with drilling the wellbore based on the received electromagnetic radiation.

In some embodiments, determining torsion associated with drilling the wellbore based on the received electromagnetic radiation may includes detecting a plurality of deviations in the electromagnetic radiation indicating a identifiable feature in a wellbore, determining a velocity of the drill bit based on a period between detections of the deviations, and determining deviations in the velocity of the drill bit. In some embodiments, the identifiable feature is a physical feature in the wellbore. In certain embodiments, the deviations indicating a identifiable feature in the wellbore comprise peaks in an amount of electromagnetic radiation being received at a particular point in time.

In particular embodiments, the opto-analytical device comprises a first sensor and a second sensor coupled to the drilling tool, each sensor displaced longitudinally along the drilling tool with respect to one another, and determining torsion associated with drilling the wellbore based on the received electromagnetic radiation comprises determining an offset between the first and second sensors. In such embodiments, determining an offset between the first and second sensors may be based on positions of the first and second sensors with respect to an identifiable feature in the wellbore. Alternatively, determining an offset between the first and second sensors may be based on positions of the first and second sensors with respect to an identifiable feature on the drilling tool.

BRIEF DESCRIPTION OF THE DRAWINGS

For a more complete understanding of the present disclosure and its features and advantages, reference is now made to the following description, taken in conjunction with the accompanying drawings, in which:

FIG. 1 illustrates an example embodiment of a drilling system in accordance with some embodiments of the present disclosure;

DETAILED DESCRIPTION

Figure 2A:
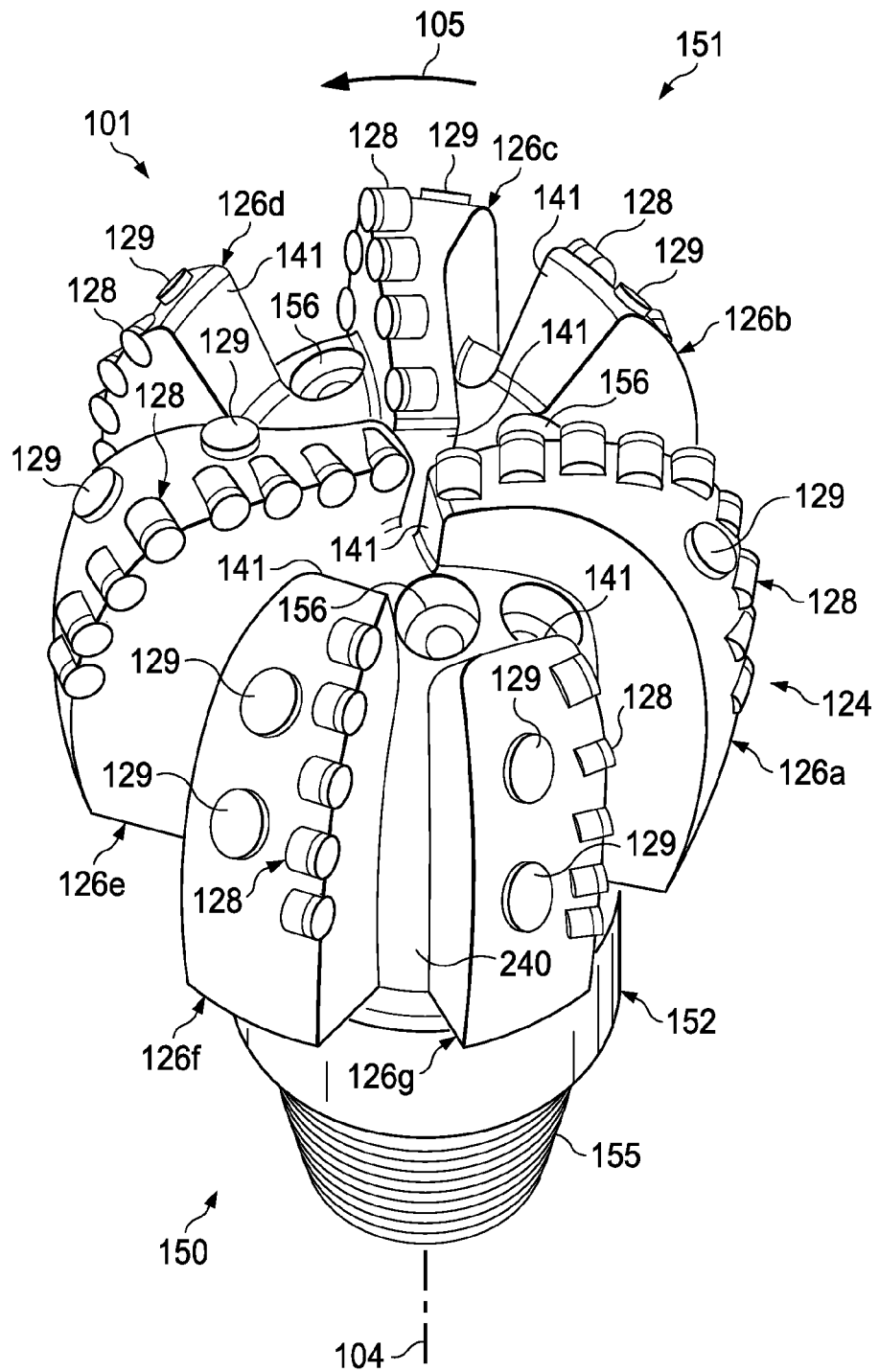
FIG. 2A illustrates an isometric view of a rotary drill bit oriented upwardly in a manner often used to model or design drill bits in accordance with some embodiments on the present disclosure.

Embodiments of the present disclosure and its advantages may be understood by referring to FIGS. 1 through 19, where like numbers are used to indicate like and corresponding parts.

FIG. 1 illustrates an example embodiment of a drilling system 100 configured to drill a wellbore 114 into a geological formation in accordance with some embodiments of the present disclosure. While drilling through a geological formation, one or more drilling characteristics may affect the performance of drilling system 100. Additionally, modifications may be made to the drilling of wellbore 114 based on the presence of certain drilling characteristics. Further, the design of one or more drilling tools (e.g., drill bit, reamer, stabilizer, hole enlarger, etc.) of drilling system 100 may be determined based on the drilling characteristics. These drilling characteristics may include properties of the formation itself (e.g., porosity, permeability, plasticity, density, rock strength, stress, etc.), changes in the formation being drilled (such as bedding planes, fractures, compositional elements, etc.), the presence of types of fluids in the formation, the presence of brines in the formation, the presence of hydrocarbons (e.g., oil, natural gas) in the formation, changes in concentration of gases in the formation, temperatures of components of the drilling tool, vibration of the drilling tool and drill string, weight on bit, torque on bit, bit rotational speed, rate of penetration, bit mechanicals, specific energy, torsion, bit whirl, bit walk, bit tilt, cutting element wear, depth of cut, cutting sizes, drilling fluid types and speed in the hole annuals, rock chemistry and/or composition, texture, water, salt, pH, impurities, temperature, pressure etc.

In many instances it may be advantageous to measure one or more drilling characteristics during the process of drilling wellbore 114. Measuring one or more drilling characteristics during the process of drilling wellbore 114 may allow for a more accurate representation of the effects that drilling characteristics may have on the drilling process and drilling tools of drilling system 100. For example, measuring drilling tool properties (e.g., the temperature, vibration, torsion, wear, etc. of drilling tools) during drilling may allow for a more accurate analysis of the physical conditions and strain that may affect the drilling tools of drilling system 100. Additionally, measurements of formation properties (e.g., rock strength, stress, porosity, density, plasticity, rock type, and rock composition) during the process of drilling through the formation may also provide a more accurate analysis of the physical conditions that may affect the drilling tools and drilling system 100. Further, measuring the presence of certain gases at or near the end of wellbore 114 may allow for preparations at well site 106. For instance, the detection of certain gases at or near the end of wellbore 114 may require different preparations (e.g. safety) at well site 106.

Accordingly, the drilling tools may be modified for improved performance through a more accurate representation of the physical conditions that may affect the drilling tools. For example, an analysis of the wear of a drilling tool during drilling and an analysis of the rock strength of the formation being drilled may allow for modifications of the design of the drilling tool (or other drilling tools to be used in the same location) to better cut through a formation having that particular rock strength. Additionally, an analysis of the measured temperature during drilling may allow for determining the particular temperature tolerances of the drilling tools of drilling system 100. More examples of modifications that may be made with respect to certain drilling characteristics are discussed in detail below.

Measuring drilling characteristics during the process of drilling wellbore 114 may also allow for modifications to be made to the process of drilling wellbore 114 based on one or more drilling characteristics. For example, measuring an increased presence of a hydrocarbon (e.g., oil, natural gas) at or near the end of wellbore 114 may indicate that a drilling tool (e.g., drill bit) has reached a hydrocarbon reservoir.

As described in further detail below, in accordance with one or more embodiments of the present disclosure, one or more opto-analytical devices may be configured to measure one or more drilling characteristics. The one or more opto-analytical devices may be integrated with one or more drilling tools of drilling system 100 such that the one or more opto-analytical devices may measure the one or more drilling characteristics at or near the end of wellbore 114 during the process of drilling wellbore 114. As discussed in further detail with respect to FIG. 3, an opto-analytical device may be configured to measure a drilling characteristic based on the interaction of electromagnetic radiation with the formation and/or drilling tool. Therefore, the one or more opto-analytical devices integrated with the one or more drilling tools may allow for measuring one or more drilling characteristics during the process of drilling wellbore 114, which may allow for better design of drilling tools and desired modifications to the drilling of wellbore 114.

Drilling system 100 may include a well surface or well site 106. Various types of drilling equipment such as a rotary table, drilling fluid pumps and drilling fluid tanks (not expressly shown) may be located at a well surface or well site 106. For example, well site 106 may include a drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may include a drill string 103 associated with drill bit 101 that may be used to form a wide variety of wellbores or bore holes such as generally vertical wellbore 114a or generally horizontal wellbore 114b as shown in FIG. 1. Various directional drilling techniques and associated components of a bottom hole assembly (BHA) 120 of drill string 103 may be used to form horizontal wellbore 114b. For example, lateral forces may be applied to BHA 120 proximate kickoff location 113 to form horizontal wellbore 114b extending from generally vertical wellbore 114a.

BHA 120 may be formed from a wide variety of components configured to form a wellbore 114. For example, components 122a, 122b and 122c of BHA 120 may include, but are not limited to, drill bits (e.g., drill bit 101), drill collars, rotary steering tools, directional drilling tools, downhole drilling motors, reamers, hole enlargers or stabilizers. The number of components such as drill collars and different types of components 122 included in BHA 120 may depend upon anticipated downhole drilling conditions and the type of wellbore that will be formed by drill string 103 and rotary drill bit 101. As discussed in further detail below, one or more opto-analytical devices may be integrated with one or more components of BHA 120 such that one or more drilling characteristics may be measured in wellbore 114 during the process of drilling wellbore 114.

Wellbore 114 may be defined in part by a casing string 110 that may extend from well surface 106 to a selected downhole location. Portions of a wellbore 114, as shown in FIG. 1, that do not include casing string 110 may be described as "open hole." Various types of drilling fluid may be pumped from well surface 106 through drill string 103 to attached drill bit 101. Such drilling fluids may be directed to flow from drill string 103 to respective nozzles (depicted as nozzles 156 in FIG. 2) passing through rotary drill bit 101. The drilling fluid may be circulated back to well surface 106 through an annulus 108. Annulus may refer to the space between the outside of the drill pipe or drill collars and the casing or wellbore, and may be defined in part by outside diameter 112 of drill string 103 and inside diameter 118 of wellbore 114a. Inside diameter 118 may be referred to as the "sidewall" of wellbore 114a. Annulus 108 may also be defined by outside diameter 112 of drill string 103 and inside diameter 111 of casing string 110.

Drilling system 100 may also include a drill bit 101. Drill bit 101 may be any of various types of drill bits including percussion bits, roller cone bits, coring bits and fixed cutter drill bits. Drill bit 101 may be designed and formed in accordance with teachings of the present disclosure and may have many different designs, configurations, and/or dimensions according to the particular application of drill bit 101. As disclosed in further detail below with respect to FIGS. 3-19, one or more opto-analytical devices (not expressly shown) may be integrated with drill bit 101 such that the one or more opto-analytical devices may measure one or more drilling characteristics at or near the end of wellbore 114 during the process of drilling wellbore 114.

FIG. 2 illustrates an isometric view of a rotary drill bit 101 oriented upwardly in a manner often used to model or design drill bits in accordance with some embodiments on the present disclosure. In the present embodiment, drill bit 101 may be any of various types of fixed cutter drill bits, including PDC bits, drag bits, matrix drill bits, and/or steel body drill bits operable to form wellbore 114 extending through one or more downhole formations. Drill bit 101 may be designed and formed in accordance with teachings of the present disclosure and may have many different designs, configurations, and/or dimensions according to the particular application of drill bit 101.

Drill bit 101 may include one or more blades 126 (e.g., blades 126a-126g) that may be disposed outwardly from exterior portions of rotary bit body 124 of drill bit 101. Rotary bit body 124 may have a generally cylindrical body and blades 126 may be any suitable type of projections extending outwardly from rotary bit body 124. For example, a portion of blade 126 may be directly or indirectly coupled to an exterior portion of bit body 124, while another portion of blade 126 may be projected away from the exterior portion of bit body 124. Blades 126 formed in accordance with teachings of the present disclosure may have a wide variety of configurations including, but not limited to, substantially arched, helical, spiraling, tapered, converging, diverging, symmetrical, and/or asymmetrical.

In some cases, blades 126 may have substantially arched configurations, generally helical configurations, spiral shaped configurations, or any other configuration satisfactory for use with each downhole drilling tool. One or more blades 126 may have a substantially arched configuration extending from proximate rotational axis 104 of drill bit 101. The arched configuration may be defined in part by a generally concave, recessed shaped portion extending from proximate bit rotational axis 104. The arched configuration may also be defined in part by a generally convex, outwardly curved portion disposed between the concave, recessed portion and exterior portions of each blade which correspond generally with the outside diameter of the rotary drill bit.

Each of blades 126 may include a first end disposed proximate or toward bit rotational axis 104 and a second end disposed proximate or toward exterior portions of drill bit 101 (e.g., disposed generally away from bit rotational axis 104 and toward uphole portions of drill bit 101). The terms "uphole" and "downhole" may be used to describe the location of various components of drilling system 100 relative to the bottom or end of wellbore 114 shown in FIG. 1. For example, a first component described as uphole from a second component may be further away from the end of wellbore 114 than the second component. Similarly, a first component described as being downhole from a second component may be located closer to the end of wellbore 114 than the second component.

Blades 126a-126g may include primary blades disposed about the bit rotational axis. For example, in FIG. 2A, blades 126a, 126c, and 126e may be primary blades or major blades because respective first ends 141 of each of blades 126a, 126c, and 126e may be disposed closely adjacent to associated bit rotational axis 104. In some embodiments, blades 126a-126g may also include at least one secondary blade disposed between the primary blades. Blades 126b, 126d, 126f, and 126g shown in FIG. 2 on drill bit 101 may be secondary blades or minor blades because respective first ends 141 may be disposed on downhole end 151 a distance from associated bit rotational axis 104. The number and location of secondary blades and primary blades may vary such that drill bit 101 includes more or less secondary and primary blades. Blades 126 may be disposed symmetrically or asymmetrically with regard to each other and bit rotational axis 104 where the disposition may be based on the downhole drilling conditions of the drilling environment. In some cases, blades 126 and drill bit 101 may rotate about rotational axis 104 in a direction defined by directional arrow 105.

Each blade may have a leading (or front) surface disposed on one side of the blade in the direction of rotation of drill bit 101 and a trailing (or back) surface disposed on an opposite side of the blade away from the direction of rotation of drill bit 101. Blades 126 may be positioned along bit body 124 such that they have a spiral configuration relative to rotational axis 104. In other embodiments, blades 126 may be positioned along bit body 124 in a generally parallel configuration with respect to each other and bit rotational axis 104.

Blades 126 may include one or more cutting elements 128 disposed outwardly from exterior portions of each blade 126. For example, a portion of cutting element 128 may be directly or indirectly coupled to an exterior portion of blade 126 while another portion of cutting element 128 may be projected away from the exterior portion of blade 126. Cutting elements 128 may be any suitable device configured to cut into a formation, including but not limited to, primary cutting elements, backup cutting elements, secondary cutting elements or any combination thereof. By way of example and not limitation, cutting elements 128 may be various types of cutters, compacts, buttons, inserts, and gage cutters satisfactory for use with a wide variety of drill bits 101.

Cutting elements 128 may include respective substrates with a layer of hard cutting material disposed on one end of each respective substrate. The hard layer of cutting elements 128 may provide a cutting surface that may engage adjacent portions of a downhole formation to form wellbore 114. The contact of the cutting surface with the formation may form a cutting zone associated with each of cutting elements 128. The edge of the cutting surface located within the cutting zone may be referred to as the cutting edge of a cutting element 128.

Each substrate of cutting elements 128 may have various configurations and may be formed from tungsten carbide or other materials associated with forming cutting elements for rotary drill bits. Tungsten carbides may include, but are not limited to, monotungsten carbide (WC), ditungsten carbide ($W_2C$), macrocrystalline tungsten carbide and cemented or sintered tungsten carbide. Substrates may also be formed using other hard materials, which may include various metal alloys and cements such as metal borides, metal carbides, metal oxides and metal nitrides. For some applications, the hard cutting layer may be formed from substantially the same materials as the substrate. In other applications, the hard cutting layer may be formed from different materials than the substrate. Examples of materials used to form hard cutting layers may include polycrystalline diamond materials, including synthetic polycrystalline diamonds.

In accordance with some embodiments of the present disclosure, as described below with respect to FIGS. 5 and 6, one or more opto-analytical devices may be integrated with drill bit 101 to determine one or more drilling characteristics associated with cutting elements 128 including temperatures of cutting elements 128 during drilling, the depth of cut of cutting elements 128, wear of cutting elements 128, the size of cuttings produced by cutting elements 128 etc.

In some embodiments, blades 126 may also include one or more depth of cut controllers (DOCCs) 129 configured to control the depth of cut of cutting elements 128. A DOCC 129 may include an impact arrestor, a backup cutter and/or an MDR (Modified Diamond Reinforcement). Exterior portions of blades 126, cutting elements 128 and DOCCs 129 may form portions of the bit face.

Blades 126 may further include one or more gage pads (not expressly shown) disposed on blades 126. A gage pad may be a gage, gage segment, or gage portion disposed on exterior portion of blade 126. Gage pads may often contact adjacent portions of wellbore 114 formed by drill bit 101. Exterior portions of blades 126 and/or associated gage pads may be disposed at various angles, positive, negative, and/or parallel, relative to adjacent portions of generally vertical wellbore 114a. A gage pad may include one or more layers of hardfacing material.

Uphole end 150 of drill bit 101 may include shank 152 with drill pipe threads 155 formed thereon. Threads 155 may be used to releasably engage drill bit 101 with BHA 120, described in detail below, whereby drill bit 101 may be rotated relative to bit rotational axis 104. Downhole end 151 of drill bit 101 may include a plurality of blades 126a-126g with respective junk slots or fluid flow paths 240 disposed therebetween. Additionally, drilling fluids may be communicated to one or more nozzles 156. As mentioned above, in accordance with some embodiments of the present disclosure, one or more opto-analytical devices may be integrated with drill bit 101 to determine the temperature of one or more cutting elements 128 and the size of cuttings of the formation made by cutting elements 128. Nozzles 156 may be designed based on the determined cutting sizes to more effectively deliver drilling fluids where needed. Additionally, nozzles 156 may be redesigned based on the measured temperatures of cutting elements 128 such that nozzles 156 may more effectively direct drilling fluid to cool cutting elements 128.

The rate of penetration (ROP) of drill bit 101 is often a function of both weight on bit (WOB) and revolutions per minute (RPM). Referring back to FIG. 1, drill string 103 may apply weight on drill bit 101 and may also rotate drill bit 101 about bit rotational axis 104 to form wellbore 114 (e.g., wellbore 114a or wellbore 114b). The depth of cut per revolution (or "depth of cut") may also be based on ROP and RPM of a particular bit and indicates how deeply drill bit cutting elements 128 are engaging the formation.

For some applications a downhole motor or "motor" (not expressly shown) may be provided as part of BHA 120 to also rotate drill bit 101 in order to provide directional and horizontal drilling to form wellbore 114b through kickoff location 113. There are two drilling modes during directional and horizontal drilling using a motor. The first mode may be referred to as "sliding mode" drilling. In this mode, drill string 103 above the motor (not expressly shown) does not rotate in order for drill bit 101 to build/drop an angle and to drill into a curve. Sliding mode drilling may be used primarily to change drilling direction. The second mode may be referred to as "rotating mode" drilling. In this mode, both drill string 103 and the motor (not expressly shown) are rotating. Rotating mode drilling may be used to drill a lateral section or a straight hole as shown in generally horizontal wellbore 114b.

When drilling through a curved section of a wellbore in sliding mode, it may be difficult to transfer axial force to drill bit 101 due to the axial friction between drill string 103 and kickoff downhole wall 118b. As the angle of wellbore 114 changes from essentially vertical to essentially horizontal through kickoff location 113, drill string 103 is held against the lower wall of the wellbore, e.g., kickoff downhole wall 118b, by gravity. In this situation, drill string 103 from kickoff location 113 to generally horizontal wellbore 114b may not exert much force, or WOB, because most of the weight of drill string 103 is exerted on the lower wall of the wellbore. Force, or WOB, exerted on drill bit 101 must overcome the friction between drill string 103 and kickoff downhole wall 118b of wellbore 114. This situation may lead to a small force, or WOB, in sliding mode in addition to a low ROP and depth of cut per revolution.

Figure 2B:
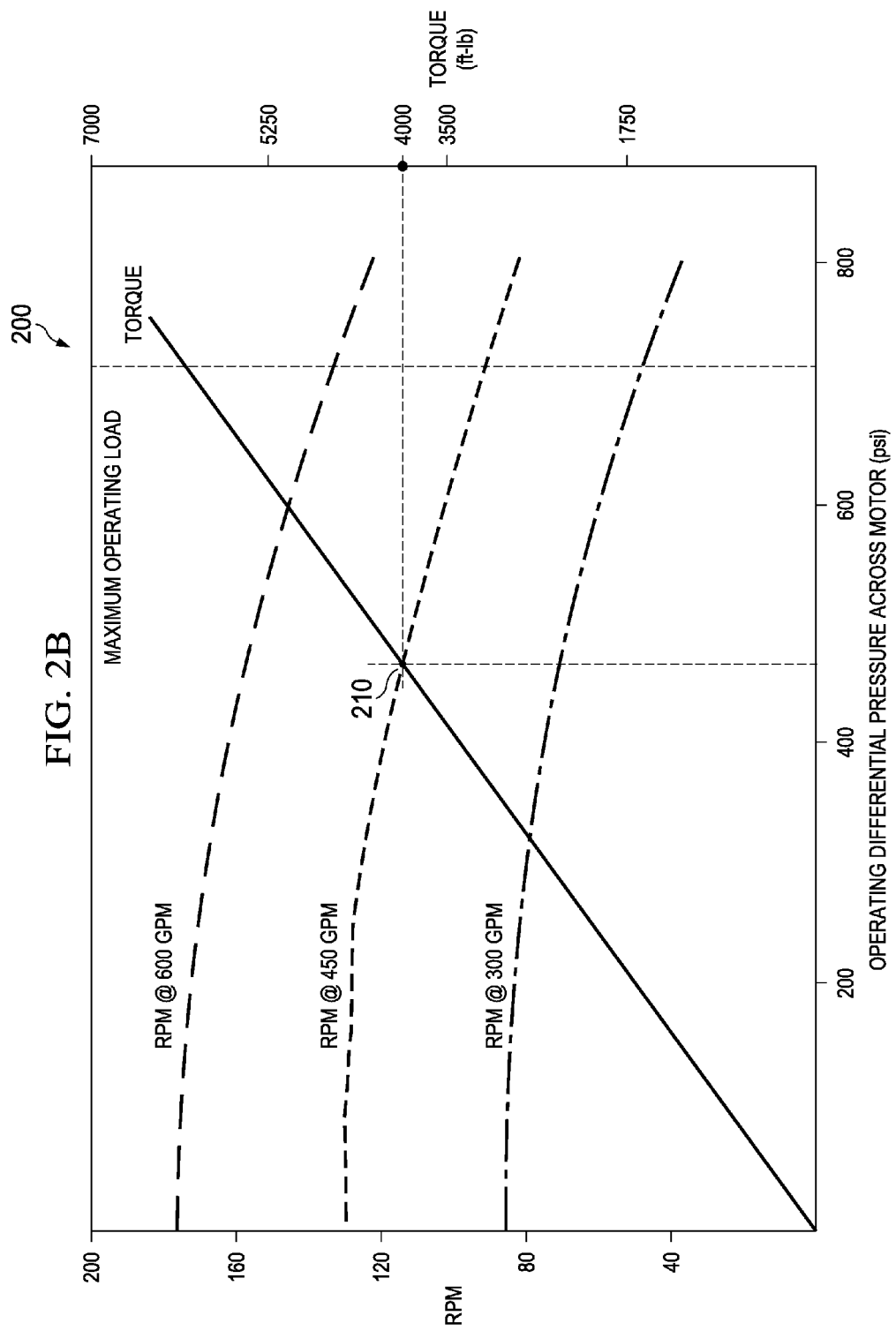
FIG. 2B illustrates an example graph of output torque of a motor as a function of rotational speed, fluid speed, and differential pressure.

Additionally, in sliding mode drilling, torque on bit (TOB), which is the torque used to rotate drill bit 101, may be limited because torque may only be provided by the motor (not expressly shown) and not by drilling rig 102. The maximum output torque from the downhole motor (not expressly shown) may be a function of rotational speed expressed as revolutions per minute (RPM), fluid speed expressed as gallons per minute (GPM), and operational differential pressure across the motor expressed in pounds per square inch (psi). Accordingly, FIG. 2B illustrates graph 200 of output torque of a motor as a function of rotational speed, fluid speed, and differential pressure. FIG. 2B may be part of a technical specification that may be provided by a motor manufacturer. One example of a downhole motor is a SperryDrill® or GeoForce® motor (Sperry Drilling Services at Halliburton Company, TX). From FIG. 2B, for a given RPM, GPM, and differential pressure, the maximum output torque may be determined. For example, as shown by point 210, at approximately 130 RPM, approximately 450 GPM, and approximately 470 psi, the output torque may be approximately 4000 ft-lb for a motor having the characteristics illustrated in graph 200 of FIG. 2B. If TOB is larger than approximately 4000 ft-lb, then the motor may stall such that the motor ceases to turn. Motor stall may occur if the instant depth of cut of drill bit 101 is large enough that the combination of TOB and RPM produced by the motor is not sufficient to rotate drill bit 101. Additionally, as the TOB increases, the drill string may experience torsion (e.g., twist) causing the drill string to windup. As described in detail below with respect to FIGS. 9-10, in some embodiments one or more opto-analytical device integrated with one or more components of BHA 120 may be configured to measure drilling characteristics associated with torsion of the drill string.

Accordingly, as mentioned above and described in detail below, one or more opto-analytical devices may be integrated with one or more components of BHA 120 to determine one or more drilling characteristics at or near the end of wellbore 114 during the process of drilling wellbore 114. The measurements obtained by the one or more opto-analytical devices may allow for improved designs of drilling tools. The measurements of the drilling characteristics may also allow for modifications to drilling operations during the drilling of wellbore 114 to improve the efficiency of drilling wellbore 114.

Modifications, additions, or omissions may be made to FIG. 2 without departing from the scope of the present disclosure. For example, a drill bit such as drill bit 101 may be designed such that the bit does not includes one or more blades 126. In such embodiments, cutting elements 128 may be located directly on bit body 124, and may still provide a cutting surface that may engage adjacent portions of a downhole formation to form wellbore 114.

Figure 3:
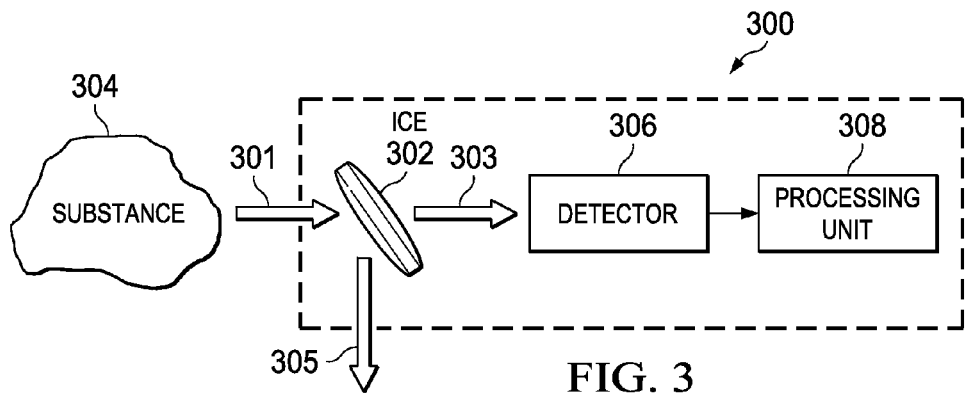
FIG. 3 illustrates a block diagram of an opto-analytical device configured to determine one or more characteristics of a sample in accordance with some embodiments of the present disclosure.

FIG. 3 illustrates a block diagram of an opto-analytical device 300 configured to determine one or more characteristics of a sample 304 in accordance with some embodiments of the present disclosure. As used herein, the term "characteristic" may refer to a chemical, mechanical or physical property of a substance or material. A characteristic of a substance may include a quantitative value or a concentration of one or more chemical components therein. Illustrative characteristics of a substance that can be monitored with the opto-analytical devices disclosed herein can include, for example, chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like.

Opto-analytical device 300 may include an integrated computational element (ICE) 302 configured to receive electromagnetic radiation 301 from a sample 304. ICE 302 may be configured to detect a characteristic of sample 304 based on the received electromagnetic radiation 301.

When electromagnetic radiation interacts with sample 304, unique physical and/or chemical information about sample 304 may be encoded in electromagnetic radiation 301 that is reflected from, transmitted through or radiated from sample 304. Information associated with each different characteristic may be encoded in electromagnetic radiation 301.

As used herein, the term "electromagnetic radiation" refers to electromagnetic waves of any wavelength, including radio waves, microwave radiation, infrared and near-infrared radiation, visible light, ultraviolet light, X-Ray radiation and gamma ray radiation. Electromagnetic radiation 301 may come from any number of sources. For example, electromagnetic radiation 301 may originate from heat emanating from sample 304. Electromagnetic radiation 301 may be radiation emanating from or fluorescing from sample 304. In other embodiments, electromagnetic radiation 301 may be derived from an active electromagnetic source (e.g., infrared, UV, visible light) that illuminates sample 304. The electromagnetic source may be located within a portion of the drill bit, such as within a cavity of the drill bit. In some embodiments, electromagnetic radiation may be derived from heat emanating from one or more portions of the drill bit. For example, a cutting element may be formed in a way that mimics a worn cutting element such that it generates heat and/or electromagnetic radiation when it is applied to the formation. In other embodiments, electromagnetic radiation may be naturally occurring either in the background or from the sample itself due to natural fluorescent or phosphorescent processes. In other embodiments, electromagnetic radiation may results from chemi-luminescent or tribo-luminescent processes. Finally, in other embodiments, electromagnetic radiation may be obtained from optical conveying devices such as electromagnetic radiation fibers, waveguides, light pipes, and the like readily appreciated by those familiar in the art.

Sample 304 may be any type of material or area that may have one or more characteristics that may be of interest. For example, in the context of drilling, sample 304 may be the formation itself, one or more components of drilling tools or a space within the wellbore that may include one or more liquids or gases, and/or the liquid or gas itself. Accordingly, electromagnetic radiation 301 received from sample 304 may include information associated with any number of characteristics associated with sample 304. For example, if sample 304 is the formation, electromagnetic radiation 301 may include information indicating the chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like. As another example, if sample 304 is the space within a wellbore, electromagnetic radiation 301 may include spectral signatures associated with the presence and/or concentration of fluids (e.g., oil or natural gas) present in the wellbore.

ICE 302 may be configured to receive electromagnetic radiation 301 and detect a particular characteristic of sample 304 based on a correlation associated with the particular characteristic included in electromagnetic radiation 301. The underlying theory behind using integrated computational elements for conducting analyses is described in more detail in the following commonly owned United States Patents and Patent Application Publications, each of which is incorporated herein by reference in its entirety: U.S. Pat. Nos. 6,198,531; 6,529,276; 7,123,844; 7,834,999; 7,911,605; and 7,920,258; and U.S. Patent Publication Nos. 2009/0219538; 2009/0219539; and 2009/0073433.

There are a wide variety of implementations that may be employed to create ICE. In one embodiment, ICE 302 may include a plurality of alternating layers of optical elements (e.g., silicon, germanium, or other similar materials) with transmissive, reflective, and/or absorptive properties suitable for detecting a characteristic of interest. For example, the alternating layers may be niobium pentoxide ($Nb_2O_5$), and Niobium and/or Silicon and quartz ($SiO_2$) deposited on a substrate (e.g., glass, diamond, quartz, sapphire, ZnSe, ZnS, Ge, Si, etc.). In general, the materials forming the alternate layers may consist of materials that have indices of refraction that differ from one another, e.g., one has a low index of refraction and the next has a high index of refraction. Other suitable materials for the layers may include, but are not limited to, metals and their oxides and semiconductor materials and their oxides, nitrides, and carbides such as germanium and Germania, $MgF_2$, SiO, SiC, and other thin film capable materials familiar with those skilled in the art (more complete lists can be found at: http://www.plasmaterials.com/ThinFilmEvapMatSrcRef.pdf and http://www-.cleanroom.byu.edu/TFE_materials.phtml). The number of layers and the thickness of the layers may be determined and constructed from the spectral attributes of the characteristic of interest as determined from a spectroscopic analysis of the characteristic using a conventional spectroscopic instrument. In general, the combination of layers correspond or are related to the spectral correlation of the characteristic of interest.

The multiple layers may have different refractive indices. By properly selecting the materials of the layers and their spacing, ICE 302 can be made to selectively transmit, absorb, and/or reflect predetermined fractions of electromagnetic radiation at different wavelengths. Each wavelength may be given a pre-determined weighting or loading factor. The thicknesses and spacing of the layers may be determined using a variety of approximation methods from the spectrograph of the characteristic of interest. These methods may include inverse Fourier transform (IFT) of the optical transmission spectrum and structuring the optical calculation device as the physical representation of the IFT. The approximations convert the IFT into a structure based on known materials with constant refractive indices. In addition to solids, ICE 302 may also contain liquids and/or gases in combination with solids to create the desired layers. ICE 302 may also include holographic optical elements, gratings, and/or acousto-optic elements, for example, that may create the transmission, reflection, and/or absorption properties of interest for the layers of ICE 302.

The weightings that ICE 302 layers apply at each wavelength are set such that they relate or correlate to the regression weightings described with respect to a known equation, or data, or spectral correlation of the characteristic of interest. The intensity of transmitted, absorbed, or reflected electromagnetic radiation 303 is related to the amount (e.g., concentration) of the characteristic of interest associated with sample 304. Accordingly, ICE 302 may be configured to detect a particular characteristic of sample 304 based on the correlation associated with the particular characteristic that is included in received electromagnetic radiation 301.

Although the operation of ICE 302 is often illustrated in the optical transmission mode, it is readily understood that ICE can operate as well in other optical modes, such as reflection, absorption, transflectance, Raman, Brillion, and Raleigh scattering modes, emittance or fluorescent modes, as well as evanescent modes known to those skilled in the art. In addition, components of ICE 302 may also be realized with a variety of other techniques. These include, but are not limited to, holographic optical elements (HOE's), phase gratings, optical gratings, Digital Light Pipe (DLP) devices, liquid crystal devices, photo-acoustic devices, and even naturally occurring substances such as water (e.g. in a curvette or holder) and gases (e.g. water vapor, CO, $CO_2$, methane, hydrocarbon gases, NO and NOx nitrogen gases, etc).

In addition, significant benefits may be realized by combining the outputs of two or more integrated computational elements with one another when analyzing a single characteristic of interest. Specifically, significantly increased detection accuracy may be realized. Analysis techniques utilizing combinations of two or more integrated computational elements are described in commonly owned U.S. patent application Ser. Nos. 13/456,255; 13/456,264; 13/456,283; 13/456,302; 13/456,327; 13/456,350; 13/456,379; 13/456,405; and 13/456,443; each filed on Apr. 26, 2012 and incorporated herein by reference in its entirety.

Opto-analytical device 300 may include a detector 306 configured to receive transmitted electromagnetic radiation 303 from ICE 302. Detector 306 may include any suitable apparatus, system, or device configured to detect the intensity of transmitted electromagnetic radiation 303 and generate a signal related to the intensity of transmitted electromagnetic radiation 303 received from ICE 302. For example, detector 306 may be configured to generate a voltage related to the intensity of transmitted electromagnetic radiation 303. Detector 306 may communicate the signal (e.g., voltage signal) related to the intensity of transmitted electromagnetic radiation 303 to a processing unit 308. Examples of detectors include split detectors, quad detectors, and array detectors.

Processing unit 308 may be configured to receive the signal communicated from detector 306 and correlate the received signal with the characteristic of which ICE 302 is configured to detect. For example, ICE 302 may be configured to detect temperature of sample 304 and the intensity of transmitted electromagnetic radiation 303 transmitted from ICE 302 may accordingly be related to the temperature of sample 304. Accordingly, detector 306 may generate a voltage signal based on the intensity of electromagnetic radiation 303 and may communicate the voltage signal to processing unit 308. Processing unit 308 may then correlate the received voltage signal with a temperature such that processing unit 308 may determine a temperature of sample 304.

Processing unit 308 may include a processor that is any system, device, or apparatus configured to interpret and/or execute program instructions and/or process data associated with opto-analytical device 300. The processor may be, without limitation a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in one or more computer-readable media included in processing unit 308.

The computer-readable media may be communicatively coupled to the processor and may include any system, device, or apparatus configured to retain program instructions and/or data for a period of time (e.g., computer-readable media). The computer-readable media may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to processing unit 308 is turned off. In accordance with some embodiments of the present disclosure, the computer-readable media may include instructions for determining one or more characteristics of sample 304 based on signals received from detector 306.

ICE 302 may also be configured to reflect portions of electromagnetic radiation 301 not related to the characteristic of interest as reflected electromagnetic radiation 305. In some embodiments, ICE 302 may reflect electromagnetic radiation 305 toward another detector (not expressly shown in FIG. 3). The detector configured to receive reflected electromagnetic radiation 305 may be configured to generate a signal associated with reflected electromagnetic radiation 305 and communicate the signal to processing unit 308. Processing unit 308 may use the signal associated with electromagnetic radiation 305 to normalize the signal associated with transmitted electromagnetic radiation 303. In alternative embodiments, ICE 302 may be configured such that reflected electromagnetic radiation 305 may be related to the characteristic of interest and transmitted electromagnetic radiation 303 may be related to other characteristics of sample 304.

Opto-analytical device 300 may be configured to detect and determine a characteristic of sample 304 based on electromagnetic radiation 301 received from sample 304. Opto-analytical device 300 may include any number of ICEs 302 and associated detectors 306 configured to detect any number of characteristics of sample 304. Processing unit 308 may accordingly be configured to determine one or more properties of sample 304 based on the different characteristics detected by different ICEs 302 and associated detectors 306. Example characteristics that may be determined include chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like. In some embodiments, the characteristics described above directly correlate to the signal of the opto-analytical device and no further analysis is required to obtain the characteristic of interest. In other embodiments, processing unit 308 may determine other physical properties of the formation such as rock strength, porosity, density, or any other characteristic based upon the detected chemical compositions or characteristics of interest. Additionally, in some embodiments processing unit 308 may be configured to store collected data associated with a detected characteristic in any suitable storage medium. The collected data may then be retrieved at a later time and may be analyzed and processed to determine various properties of sample 304. In embodiments where opto-analytical device 300 is integrated with a drilling tool, processing unit 308 may be configured to communicate information associated with a detected characteristic to a well site using any suitable measurement while drilling (MWD) communication system.

When monitoring more than one characteristic at a time, various configurations for multiple ICEs 302 may be used, where each ICE 302 has been configured to detect a particular characteristic of interest. In some embodiments, the characteristic may be analyzed sequentially using multiple ICEs 302 that are presented to a single beam of electromagnetic radiation being reflected from or transmitted through a sample. In some embodiments, multiple ICEs can be located on a rotating disc, where the individual ICEs are exposed to the beam of electromagnetic radiation for a short period of time. Advantages of this approach may include the ability to analyze multiple characteristics using a single optical computing device and the opportunity to assay additional characteristics simply by adding additional ICEs to the rotating disc. In various embodiments, the rotating disc can be turned at a frequency of about 1 RPM to about 30,000 RPM such that each characteristic in a sample is measured rapidly. In some embodiments, these values may be averaged over an appropriate time domain (e.g., about 1 millisecond to about 1 hour) to more accurately determine the sample characteristics.

In other embodiments, multiple ICEs 302 may be placed in parallel, where each ICE 302 is configured to detect a particular characteristic of interest. In such embodiments, a beam splitter may divert a portion of the electromagnetic radiation from the substance being analyzed to each ICE 302. Each ICE 302, in turn, may be communicatively coupled to detector 306 or array of detectors 306 configured to detect an output of electromagnetic radiation from the ICE 302. Parallel configurations of ICEs 302 may be particularly beneficial for applications that require low power inputs and/or no moving parts. Parallel configurations of ICE's may also be particularly beneficial for applications where changes in characteristic values are rapid, such as high velocity flows.

In still additional embodiments, multiple ICEs 302 may be placed in series, such that characteristics are measured sequentially at different locations and times. For example, in some embodiments, a characteristic can be measured in a first location using a first ICE 302, and the characteristic can be measured in a second location using a second ICE 302. In other embodiments, a first characteristic may be measured in a first location using a first ICE 302, and a second characteristic may be measured in a second location using a second ICE 302.

Any of the foregoing configurations for the optical computing devices may be used in combination with a series configuration in any of the present embodiments. For example, two rotating discs having a plurality of ICEs may be placed in series for performing an analysis. Likewise, multiple detection stations, each containing ICEs 302 in parallel, may be placed in series for performing an analysis.

As mentioned above, an opto-analytical device 300 integrated with a drilling tool, such as drill bit 101 may be used to detect any number of characteristics associated with drilling a wellbore in a formation, such as chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, ionic strength, total dissolved solids, salt content, porosity, opacity, bacteria content, combinations thereof, or the like. The detection of characteristics may also be used to determine an event associated with drilling a wellbore. In some embodiments, drilling of a wellbore may be modified based on the detected characteristic.

For example, opto-analytical device 300 may be configured to detect the concentration of certain gases in a wellbore (e.g., wellbore 114 as illustrated in FIG. 1). Accordingly, when a change in gas concentration occurs, opto-analytical device 300 may detect change and drilling may be adjusted accordingly. As an example, opto-analytical device 300 may be configured to detect changes in the concentration of natural gas. A sharp increase in natural gas concentrations may indicate that the wellbore has reached a natural gas reservoir. Drilling may then be modified based on reaching the natural gas reservoir. For example, weight may be taken off the drill bit and a seal may be placed against the wall of the wellbore to seal the gas in the reservoir. In some embodiments, the sealing may be done at a BHA (e.g., BHA 120 as illustrated in FIG. 1) by processing unit 308 communicating a control signal to expand a donut to seal the gas in the wellbore upon detecting the gas. For example, when the detected event is transmitted to the surface, drilling fluid flow rates may be increased and the drilling fluid density may be optimized to maintain a pressure at the surface higher than the formation pressure in order to maintain control of the well. The drilling fluid chemistry may also be changed to include materials designed to ameliorate the toxic effects the gas. Other events that may be detected using an opto-analytical device 300 may be a change in the chemistry, rock strength, porosity and/or density of the formation being drilled. The chemistry change may indicate that a different type of rock is being drilled into, which may have different physical properties (e.g., hardness, plasticity, permeability, porosity, etc.). Drilling may be modified accordingly (e.g., the RPM, WOB etc. may be increased or decreased depending on the change in the formation). For example, if the formation is hard and the rock strength is high, a new drill bit with high density of cutting elements and small size of cutting elements may be used. If the formation is very plastic, a new shape of cutting elements such as scribe cutters may be used. If there is a change from a hard dolomitic limestone to a shale, one or more changes in drilling (e.g., introduction of drilling fluid to prevent the shale from hydrating, a reduction in the WOB or an increase in the lubrication of the drilling fluid) may be made. In some high pressure and high temperature cases, a roller cone bit may be used instead of a PDC bit. As another example, the detection of a change from a hard dolomitic lime stone to a shale may call for multiple changes in the drilling operation, such as drilling fluid to prevent the shale form hydrating, a reduction in the weight on bit, or an increase in the drilling fluid system's lubricity. Normally, these changes that would be made by an observer present at the bit. However, these changes would only be observed after the drilling fluid has carried the cutting to surface, a lag time in which the drilling fluid bit interaction is less than optimum and potentially damaging to the well. According to embodiments of the present disclosure, however, these changes may be made at a faster rate based upon events detected by the opto-analytical device.

Another event that an opto-analytical device 300 may detect is a change in from one material state (e.g., solid, liquid, gas) to another. Such changes may indicate, for example, the entrance or exit of the drilling tool with respect to a hollow pocket in the formation. As another example, such changes may indicate that the drilling tool has encountered or exited oil or gas reservoirs. For instance, an opto-analytical device 300 embodied in a horizontal strata reservoir may analyze material state to detect a water/oil interface and ensure the wellbore is above the water/oil interface. In addition, the opto-analytical device 300 may detect whether the bit has exited a certain zone of interest based on changes in material states. In the event of a detected change of material state, one or more modifications may be made to the drilling, such as lowering or increasing an RPM or changing the direction of the drilling. Furthermore, because the fluid flow and pressure balance at the surface of the formation is a critical process in drilling, uncontrolled flow into the formation (sometimes referred to as "blow out") can destroy the formation and may stop drilling until the fluid loss is controlled. Thus, in some embodiments, an opto-analytical device may detect the flow of reservoir fluids into the well bore, separate from the fluids that were in the rock freshly drilled by the bit. Certain modifications may then be made to the drilling procedure based on the detected flow. For example, fine pressure control may be achieved by increasing the drilling fluid flow rate, which may increase the local pressure at the surface through dynamic forces (e.g., viscosity of the drilling fluid). This may help disperse the incoming formation fluid while the drilling fluid system bulk density is changed at surface and circulated into the hole. Normally, this process has a lag time. However, certain embodiments of the present disclosure may correct this using downhole detection of fluids entering the well bore. For instance, the amount of water in the drilling fluid system may be modified in order to stabilize the formation based on washouts of materials such as clay or shale lenses can be detected.

An opto-analytical device 300 may also be configured to detect pH of a downhole fluid sample and thus changes in pH. The changes in pH may indicate whether the downhole fluid sample is from drilling fluids or another fluid present in the wellbore (e.g., oil, or water). A change in pH may also indicate, for example, where a fluid of interest (or its source) is located in the formation. As an example, two sources of water may be encountered: salt or fresh water. The pH would be different for each case, thereby enabling an operator of the drilling tool to determine the source of the fluid (and thereby enable the user to ameliorate or enhance its influence, depending upon the desirability.) Depending upon what fluid is encountered, a user may want to not only change a drilling speed, for example, but also a drilling direction. As another example, in the event of formation water entering the well bore (which is usually low pH due to the dissolution of acid gases in the water (predominantly carbon dioxide and hydrogen sulfide)), the drilling fluid system may be modified to maintain at least a neutral to high pH.

In the same or alternative embodiments, opto-analytical device 300 may be configured to determine a change in total dissolved solids within a drilling fluid. Examples may include dissolved rocks or rock salt dissolved in the fluid. This information may indicate what material is being encountered in the formation or the chemical or physical composition of the formation. Based on this information, a user may want to make drilling modifications. For instance, if a salt dome is encountered, the operator may want to change drilling parameters, such as RPM, WOB, or drilling direction.

Additionally, opto-analytical device 300 may be configured to determine residual stress of a formation. Residual stress may indicate the location of where the formation may fracture, and may be determined based on the gauge of the wellbore, as measured by the opto-analytical device, shortly after the drill bit has passed. Based on the determined residual stress, one or more modifications may be made to the drilling. For example, an operator may change the direction of drilling in order to avoid locations where the formation may fracture. As another example, the drilling may be stopped after determining a certain level of residual stress in order to avoid potential explosive, toxic, or corrosive gases and/or chemicals. Additionally, the stress state of the formation may inform the decision to case the well and to control the risk in the casing operation. For instance, long open hole sections under high stress conditions may collapse or may cause a casing to stick in the wellbore as the shape of the wellbore gradually oblates (i.e., changes from circular to elliptical). The casing installation may be delayed by such sticking and geometric locking, sometimes resulting in the abandonment of a section of the well or a sidetrack drilling operation, leading to great economic consequences.

The above is merely a list of examples of events associated with drilling a wellbore that may be detected by an opto-analytical device 300. Additionally, the modifications to drilling listed are merely listed as examples. Any number of drilling modifications may be made based on events detected or measurements performed by one or more opto-analytical devices 300.

Figure 4:
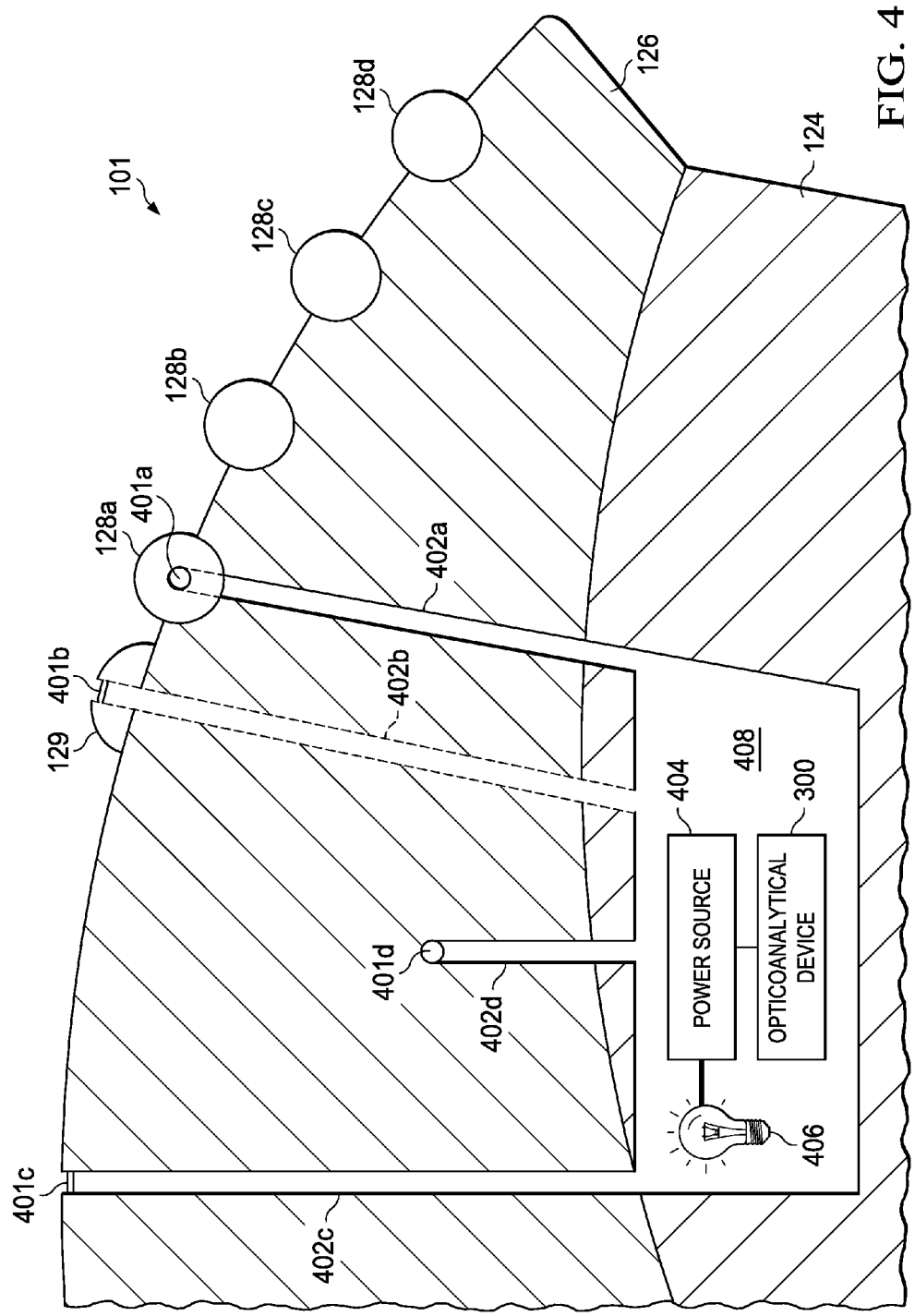
FIG. 4 illustrates a cross-sectional view of an example configuration of drill bit 101 in accordance with some embodiments of the present disclosure.

One or more opto-analytical devices, such as opto-analytical device 300, may be integrated with one or more drilling tools of a bottom hole assembly such as BHA 120 of FIG. 1. FIG. 4 illustrates a cross-sectional view of an example configuration of drill bit 101 having opto-analytical device 300 integrated therein. Drill bit 101 of FIG. 4 may include a cavity 408 formed in bit body 124 and configured to house opto-analytical device 300 described in detail above with respect to FIG. 3. Cavity 408 may also include power source 404 configured to provide power to one or more components of opto-analytical device 300. For example, in some embodiments, power source 404 may be any suitable type of battery. Power source 404 may also be a piezoelectric device configured to generate electricity based on the movement and vibration of drill bit 101 during a drilling process. Although shown as having only one power source 404, cavity 404 may include any number of power sources 404 used in any suitable combination. For example, in some embodiments cavity 408 may include a battery power source and a piezoelectric power source. In the same or alternative embodiments, the piezoelectric power source may be configured as a primary power source when drill bit 101 is moving and the battery power source may be configured as a backup power source when drill bit 101 is not moving. Additionally, in some embodiments, the piezoelectric power source may be configured to charge the battery power source. Other power sources may include generators, or micro-generators deriving their power from the movement (or differential movement) of the bit itself, or the movement of the fluids, chemical batteries, solar power sources (which would derive their power from the infrared/visible electromagnetic radiation generated by the drill bits themselves), or nuclear sources.

Cavity 408 may also be configured to house electromagnetic radiation source 406. Electromagnetic radiation source 406 may include any suitable apparatus, system, or device configured to generate electromagnetic radiation in a desired spectrum. For example, an electromagnetic radiation source 406 may be configured to generate infrared light, visible light, UV light, X-rays etc. As explained further below, the electromagnetic radiation from electromagnetic radiation source 406 may be directed toward a sample (e.g., formation, wellbore, drilling tool component, etc) such that the electromagnetic radiation from electromagnetic radiation source 406 impinges the sample. The electromagnetic radiation may then be transmitted, reflected, refracted, absorbed, etc. by the sample and received by opto-analytical device 300 to determine one or more characteristics of the sample. Electromagnetic radiation source 406 may be configured to receive power from power source 404.

Cavity 408 may also be coupled to one or more channels 402 configured to direct electromagnetic radiation to opto-analytical device 300 or from electromagnetic radiation source 406. Channels 402 may be formed in any suitable location of drill bit 101 to direct electromagnetic radiation to or from any desired location on drill bit 101. In the illustrated embodiment, channels 402 are formed in a blade 126 to direct electromagnetic radiation to or from different locations on blade 126. For example, channel 402*a* is configured to direct electromagnetic radiation to or from the face of cutting element 128, channel 402*b* is configured to direct electromagnetic radiation to or from DOCC 129, channel 402*c* is configured to direct electromagnetic radiation to or from a gage portion of blade 126 and channel 402*d* is configured to direct electromagnetic radiation to or from a location on a side face of blade 126. The actual locations of channels 402 may vary according to the desired location of illumination of an area with electromagnetic radiation or a desired area for receiving electromagnetic radiation for analysis by an opto-analytical device 300.

Channels 402 may be configured to direct electromagnetic radiation using any suitable method, system, or device. For example, one or more channels 402 may be filled with an optically transmissive material such as diamond or sapphire that may direct electromagnetic radiation through channels 402. As another example, one or more channels 402 may be coated with a reflective material such as aluminum that may direct electromagnetic radiation through channels 402. Additionally, one or more channels 402 may include an optical fiber, waveguide, or light pipe configured to carry and direct electromagnetic radiation. In some embodiments, the end of channels 402 opposite of cavity 408 may include windows 401 configured to prevent materials from entering the channels 402. Windows 401 may be any optically transmissive material suitable for withstanding drilling conditions, such as diamond, sapphire, zinc sulfide and zinc sulfide coated zinc selenide.

In some embodiments, channels 402 may be configured to house one or more components of opto-analytical device 300. For example, ICE 302 (described in FIG. 3) may be included in one or more channels 402 behind windows 401 such that the ICE 302 may receive electromagnetic radiation at or near windows 401. Additionally, detector 306 (described in FIG. 3) may be placed behind ICE 302 in channels 402. In the same or alternative embodiments, a plurality of ICEs 302 may be placed in series with each other in one or more channels 402.

Accordingly, in accordance with the present disclosure, through the use of windows 401, channels 402 and cavity 408, drill bit 101 may be configured to have one or more opto-analytical devices 300, power sources 404 and electromagnetic radiation sources 406 integrated therein. Therefore, drill bit 101 may be configured to direct electromagnetic radiation to and from desired locations such that the one or more opto-analytical devices 300 may analyze and detect one or more drilling characteristics.

Modifications, additions, or omissions may be made to FIG. 4 without departing from the scope of the present disclosure. For example, the same principles described with respect to integrating opto-analytical device 300 with drill bit 101 may be used to integrate opto-analytical device 300 with any other drilling tool (e.g., a reamer, a stabilizer, etc.). Additionally, the locations and configurations of windows 401, channels 402, cavity 408, power source 404, electromagnetic radiation source 406 and opto-analytical device 300 are merely shown as a conceptual embodiment and the actual configuration may vary depending on the particular application. It will be understood by those of ordinary skill in the art that the illustrative examples and embodiments described herein for transmission modes (i.e. directing electromagnetic radiation toward a sample) would equally apply to absorptive or reflective implementations, and vice-versa.

One or more opto-analytical devices 300 may be configured to determine any number of performance indicators of a drilling tool. For example, one or more opto-analytical devices 300 may be configured to determine the size and quantity of cuttings created by cutting elements 128 cutting into a formation. In some embodiments, certain characteristics of the cuttings (e.g., size and/or number) may indicate the cutting efficiency of a drill bit. As such, it may be advantageous to monitor the cuttings in flow channels of the drill bit to determine if the drill bit is efficiently cutting into the formation. FIG. 5 illustrates an example embodiment of drill bit 101 including one or more opto-analytical devices (not shown) configured to determine the size of cuttings 502 created by cutting elements 128, in accordance with some embodiments of the present disclosure. The one or more opto-analytical devices may be located in any suitable location of drill bit 101 to determine the size of cuttings 502. For example, the opto-analytical device may be located in channels of drill bit 101, in windows 401 of drill bit, on one or more cutting elements 128 of drill bit 101, on one or more DOCCs 129 of drill bit 101, on one or more blades 126 of drill bit 101, in one or more nozzles 156 of drill bit 101, in fluid flow paths 240 of drill bit 101, on shank 152 of drill bit 101, or any other similar location for determining the size of cuttings 502. In some embodiments, a processing unit 308 of opto-analytical device 300 may be configured to determine and store the size or other characteristic(s) of cuttings 502 as a function of time in a computer-readable medium to allow for retrieval of the data at a later time. In the same or alternative embodiments, the processing unit 308 may be configured to transmit the size determinations during drilling operations via any suitable MWD system.

In the illustrated embodiment, the leading face of blade 126g may include an electromagnetic radiation source (not expressly shown) and channel (not expressly shown) configured to direct electromagnetic radiation through window 401a of drill bit 101. In some embodiments, the electromagnetic radiation source may be configured to generate visible light and may include an incandescent light source (e.g. tungsten), a light emitting diode (LED), a laser, a fluorescent and/or phosphorescent light source, a triboluminescent source, or any other suitable electromagnetic radiation source.

The electromagnetic radiation transmitted from window 401a may illuminate cuttings 502 that move through a flow channel of drill bit 101 and past window 401a. Cuttings 502 may be pieces of a rock formation that are cut away by cutting elements 128. In some embodiments, cuttings 502 may be directed past through the flow channel and window 401a by drilling fluid flowing out of a nozzle 156. When the electromagnetic radiation impinges cuttings 502, cuttings 502 may reflect the electromagnetic radiation. Window 401b of blade 126g may be configured to receive the electromagnetic radiation reflected by cuttings 502. Window 401b may also be configured to direct the reflected electromagnetic radiation toward opto-analytical device 300 in channel 402 (described in FIGS. 3 and 4, and not expressly shown in FIG. 5). Although not expressly shown, in some embodiments of drill bit 101 each blade 12 may include window 401a configured to direct electromagnetic radiation from an electromagnetic radiation source onto cuttings 502. Additionally, although not expressly shown each blade 126 may include window 401b configured to receive electromagnetic radiation reflected by cuttings 502.

Opto-analytical device 300 may be configured to detect the size of cuttings 502 based on the intensity of the electromagnetic radiation received by opto-analytical device 300 because electromagnetic radiation transmitted, reflected, or absorbed by the cuttings is correlated and/or related to the size and distribution of the cuttings. In some embodiments, opto-analytical device 300 may be configured to detect and determine an approximation of the maximum and/or minimum size of cuttings 502. The sizes of the cuttings 502 may indicate the efficacy of cutting elements 128. For example, if the sizes of cuttings 502 decrease, this may indicate that one or more cutting elements 128 are being worn and/or that cutting elements 128 have transitioned into cutting into a harder rock. Conversely, if the sizes of cuttings 502 increase, this may indicate that cutting elements 128 have transitioned into cutting into a softer rock.

In addition to determining the size of cuttings 502, opto-analytical device 300 may be configured to determine other characteristics of cuttings 502 such as their chemical composition, hardness, etc. The chemical composition, hardness, etc. of the cuttings 502 may be compared with the sizes of the cuttings 502 to help better correlate the efficacy of cutting elements 128 with respect to different rock types. Accordingly, opto-analytical device 300 may measure and collect data that may be helpful in designing cutting elements for different formations having different properties (e.g., rock strength, stress, porosity, density, plasticity, rock type, rock composition, etc.).

Additionally, the efficacy and wear of cutting elements 128 (and thus the associated sizes of cuttings 502) may be based on the amount of drilling fluid moving past cutting elements 128. For example, the drilling fluid may cool cutting elements 128 to prolong the life of cutting elements 128. Additionally, the drilling fluid may help move cuttings 502 away from cutting elements 128 to allow cutting elements 128 to more effectively cut into the formation. The sizes of cuttings 502 may therefore indicate how much drilling fluid is reaching cutting elements 128. For example, the size of cuttings 502 measured by one opto-analytical device 300 on drill bit 101 may be substantially smaller than the size of cuttings 502 measured by another opto-analytical device 300 on drill bit 101, indicating that the cutting elements 128 associated with the smaller cuttings 502 may not be receiving a sufficient amount of drilling fluid. Therefore, the design of drill bit 101, including the number, size, and/or orientation of nozzles 156, may be modified to better deliver drilling fluid to those cutting elements 128.

One or more opto-analytical devices 300 may also be configured to determine the concentration of cuttings 502 in the drilling fluid moving past window 401b based on the size and distribution of the cuttings. The concentration of cuttings 502 may indicate the efficacy of cutting elements 128 where a higher concentration of cuttings 502 may indicate a higher cutting efficiency and a lower concentration of cuttings may indicate a lower efficiency of cutting elements 128. Additionally, a higher concentration of cuttings 502 may indicate a higher rate of penetration than a lower concentration of cuttings 502. Furthermore, a concentration of cuttings 502 as measured by one of opto-analytical devices 300 that is lower than the concentration of cuttings 502 measured by another opto-analytical device 300 on drill bit 101 may indicate that cutting elements 128 on different areas of drill bit 101 are cutting into the formation at different depths. Also, the concentration of cuttings 502 in drilling fluid may indicate the efficacy of nozzles 156 in delivering drilling fluid to cutting elements 128 to carry cuttings 502 away from cutting elements 128. One or more cutting elements 128 and/or nozzles 156 may accordingly be designed based on the cuttings concentration measurements to improve the flow of fluid past cutting elements 128 and/or the efficacy of cutting elements 128.

One of skill in the art will appreciate that one or more characteristics of cuttings 502 may be determined at any location in the wellbore. For instance, one or more characteristics of cuttings 502 may be determined further uphole than drill bit 101. For example, by measuring the size of cuttings 502 both at drill bit 101 and further uphole, it may be determined that the size of cuttings 502 is changing as they are removed from wellbore 114. An increase in the size cuttings 502, for example, may indicate that cuttings 502 have expanded in the drilling fluid. Accordingly, the amount or composition of the drilling fluid may be altered to avoid cuttings 502 from increasing or decreasing in size as they are removed from wellbore 114.

Therefore, one or more opto-analytical devices 300 may be configured to determine one or more characteristics of cuttings 502 such as the size, porosity, composition, and/or the amount or concentration of cuttings 502. The characteristics of cuttings 502 may indicate the efficacy of one or more components of a drilling tool, such as cutting elements 128 and nozzles 156, as well as the performance of the drilling tool itself (e.g., the rate of penetration of the drilling tool). The size of cuttings may be directly related to the depth of cut per revolution of cutting elements (which is a function of bit rotational speed and ROP or WOB). Therefore, for a given drill bit, the size of cuttings may indicate whether an applied WOB and/or bit rotational speed leads to efficient drilling. Accordingly, any suitable change, including the modification of the WOB, RPM, or direction or orientation of the drill bit, may be made as necessary or dictated by the determined characteristics. In addition, control and modulation of the fluid through individual jets may be accomplished based on the determined cuttings sizes, which is very desirable. The drilling fluid through each nozzle 156 may modulated to optimize rate of penetration by keeping individual cutters cool, transporting cuttings, and hydraulically jet-drilling softer formations. Taken to an extreme, the modulated flow can cause cavitation at the rock surface, causing the rock to fail and allowing spoil to be transported uphole.

Figure 5:
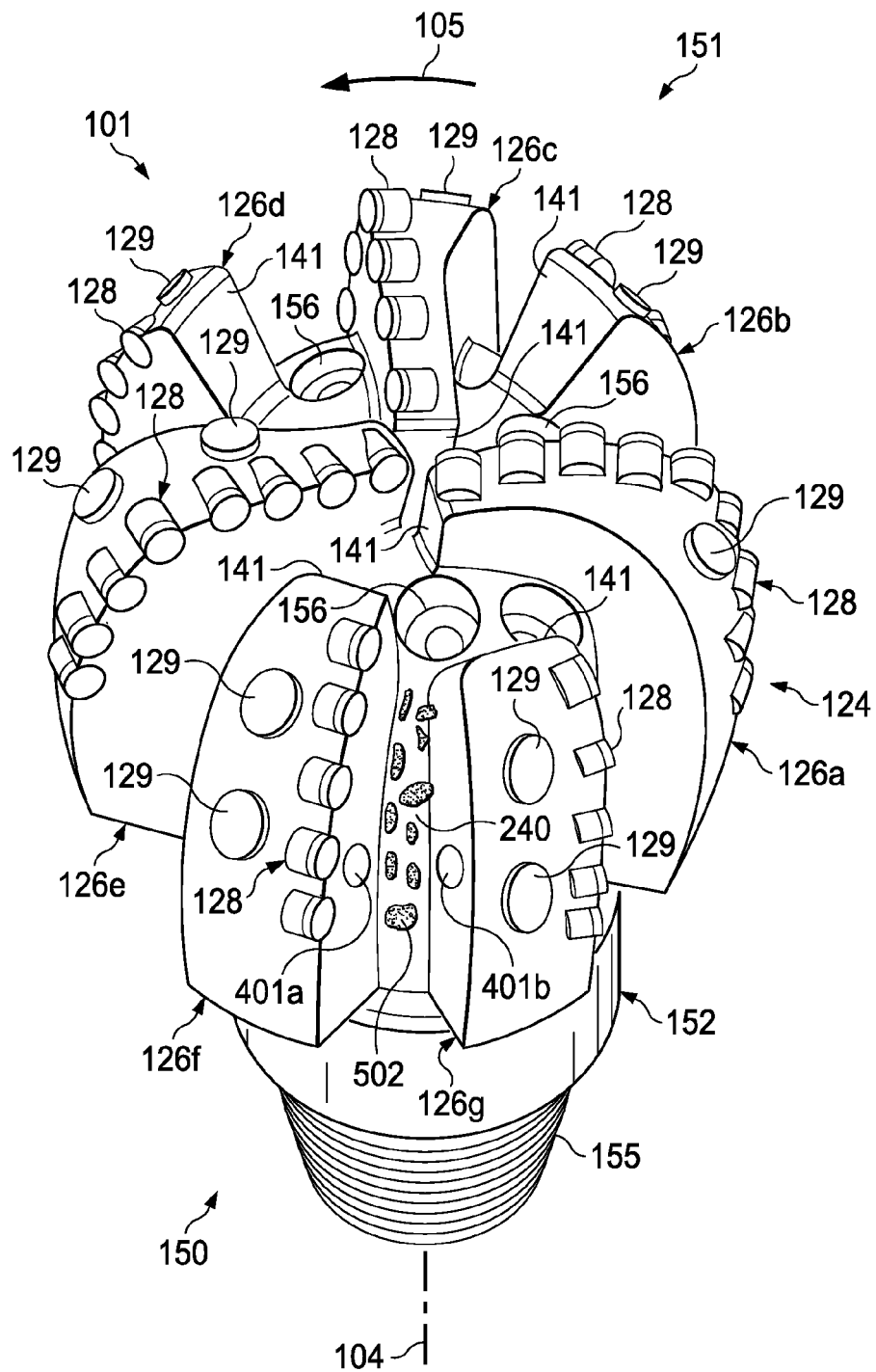
FIG. 5 illustrates an example embodiment of a drill bit integrated with one or more opto-analytical devices in accordance with some embodiments of the present disclosure.

Modifications, additions, or omissions may be made to FIG. 5 without departing from the scope of the present disclosure. For example, a roller cone drill bit, a reamer or any other drilling tool may be similarly configured to detect one or more characteristics of cuttings 502. Additionally, the locations of windows 401 and the particular electromagnetic radiation source may vary depending on the application.

Figure 6:
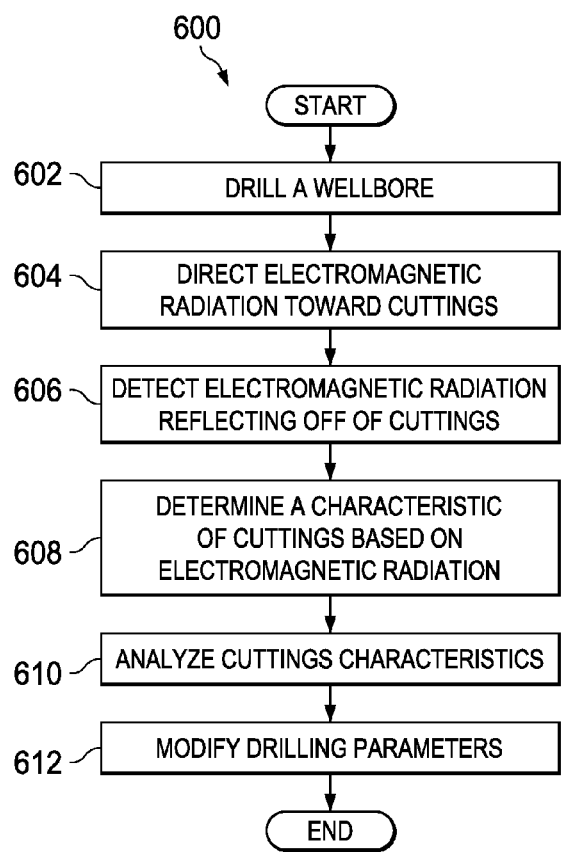
FIG. 6 illustrates an example method for analyzing cuttings associated with drilling a wellbore in accordance with some embodiments of the present disclosure.

FIG. 6 illustrates an example method 600 for analyzing cuttings associated with drilling a wellbore, in accordance with some embodiments of the present disclosure. Method 600 may be performed by any suitable system, apparatus, or device. In the present example, method 600 may be performed using a drill bit 101 configured as described with respect to FIG. 5. However, method 600 may be performed using any suitable drilling tool configured to analyze cuttings created by the drilling tool.

Method 600 may start and at step 602 drill bit 101 may be used to drill a wellbore by cutting into a geological formation. At step 604, an electromagnetic radiation source, located in a first channel formed in drill bit 101 may direct electromagnetic radiation through a first window and toward cuttings created by drill bit 101 cutting into a formation. The window and channel may be located at any suitable location on drill bit 101. At step 606, opto-analytical device 300 of drill bit 101 may detect electromagnetic radiation from the electromagnetic radiation source that reflects off of the cuttings. The electromagnetic radiation may be directed to opto-analytical device 300 via the first window and first channel, where opto-analytical device 300 is located. Alternatively, as described with respect to FIG. 5, the electromagnetic radiation may be directed to opto-analytical device 300 via a second window and a second channel, where opto-analytical device 300 is located. In one embodiment, the second window may be located on a second blade opposite of the first window, as shown in FIG. 5. In another embodiment, the second window may be located on the same blade as the first window where opto-analytical device 300 is located.

At step 608, opto-analytical device 300 may detect and determine one or more characteristics of cuttings 502 based on the electromagnetic radiation received from the cuttings. As described above with respect to FIG. 5, example characteristics of cuttings 502 that may be detected and determined are the size, porosity, composition, and/or the amount or concentration of cuttings 502, or any combination thereof. These characteristics may be used to determine the amount of desirable and/or undesirable materials inside the formation.

At step 610, the characteristics associated with the cuttings may be analyzed. For example, the sizes, shapes, and/or concentrations of cuttings as measured by different opto-analytical devices 300 located at different areas of drill bit 101 may be analyzed to compare the cutting efficiency of cutting elements 128 at different locations of drill bit 101. Additionally, the sizes and/or concentrations of the cuttings may be compared with the chemical composition of the cuttings to determine cutting efficiency for different formation types. Further, the sizes, shapes, and/or concentrations of the cuttings may be analyzed to determine the efficacy of nozzles 156 in delivering drilling fluid to cutting elements 128. The sizes, shapes, and/or concentrations of the cuttings may also be used to determine the effectiveness of the drilling fluid such as drilling fluid density and drilling fluid capacity. In addition, the cutting characteristics may also indicate a certain drilling direction or bit orientation.

At step 612, one or more parameters of drill bit 101 may be modified based on the analysis of the cuttings. For example, the sizes and/or concentrations of cuttings at different locations of drill bit 101 may indicate uneven cutting by cutting elements 128 and/or fluid distribution by nozzles 156. Accordingly, the placement, size, and/or configuration of one or more nozzles 156 and/or cutting elements 128 may be modified to achieve more even cutting and/or fluid distribution. Further, the sizes and/or concentrations of the cuttings with respect to the composition of the cuttings may indicate the efficacy of cutting elements 128 with respect to formations having that particular composition. Accordingly, determinations may be made regarding whether or not the design of cutting elements 128 may be modified to improve cutting into formations having similar compositions. For example, if the equivalent circulating density (ECD) of the drilling fluid becomes too high, the formation could be damaged. Accordingly, decreasing the ROP by reducing the WOB or RPM may result in a lower rate of cuttings entering the fluid flow and may reduce the equivalent density of the drilling fluid. For example, the size of cuttings for a given formation may be directly related to the density of cutting elements on the bit face. The small size of the cuttings may indicate that the cutting elements grind the formation with low cutting efficiency. In this case, the number of blades and the number of cutting elements on the drill bit may be reduced. As another example, the drilling direction or bit orientation may be altered based on the determined cuttings characteristics.

Figure 7A:
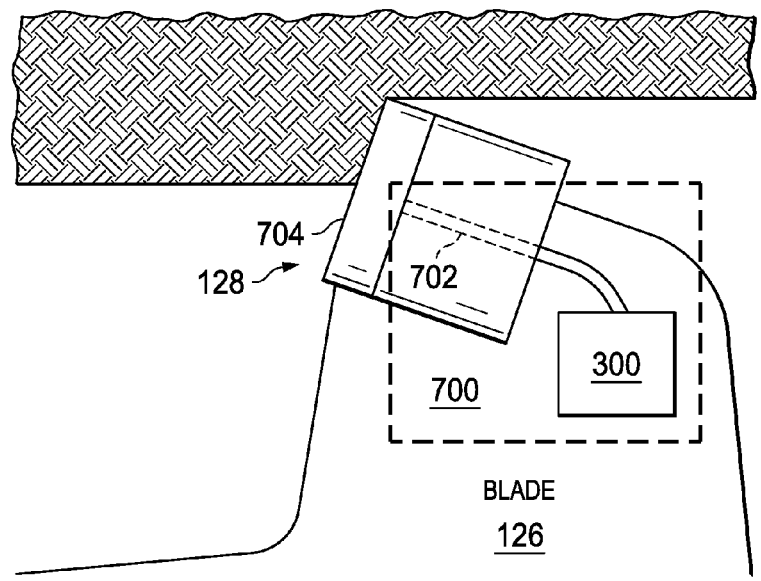
FIG. 7A illustrates an example embodiment of a temperature sensor including an opto-analytical device in accordance with some embodiments of the present disclosure.
Figure 7B:
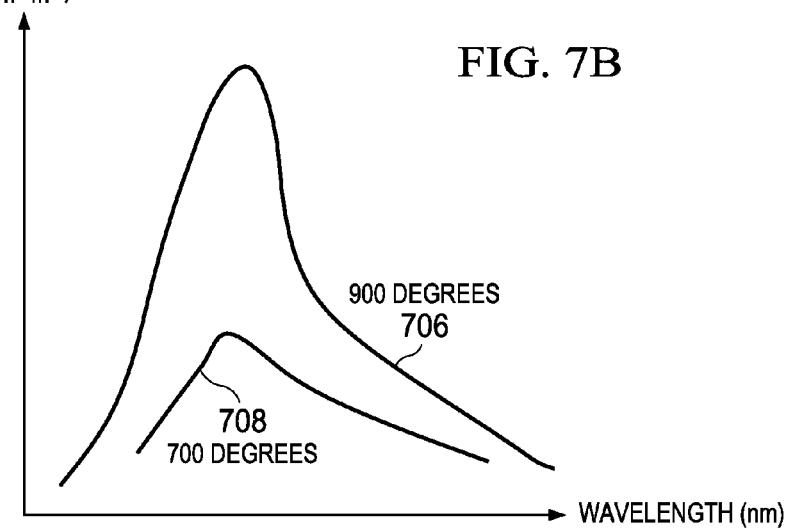
FIG. 7B illustrates example spectral signatures of a material at different temperatures in accordance with some embodiments of the present disclosure.

Another performance indicator of a drilling tool that may be measured by opto-analytical device 300 may be the temperature of one or more cutting elements 128. In some embodiments, an increase in temperature of a cutting element may indicate an increased force on the drill bit and/or significant wear of the cutting element. As such, it may be advantageous to monitor the temperature of one or more cutting elements on the drill bit to determine if there is increased force on the drill bit or excessive wear of the cutting elements in order to modify the drilling conditions. FIG. 7A illustrates an example embodiment of temperature sensor 700 including opto-analytical device 300 configured to measure the temperature of cutting element 128 of drill bit 101. Temperature sensor 700 may include channel 702 (similar to channels 402 described with respect to FIG. 4) formed in cutting element 128 and blade 126. In the illustrated embodiment, channel 702 may be behind face 704 of cutting element 128. Channel 702 may be configured to direct infrared electromagnetic radiation to opto-analytical device 300 including ICE 302 (as illustrated in FIG. 3, and not expressly shown in FIG. 7A) configured to detect temperature based on a spectral signature associated with temperature. FIG. 7B illustrates example spectral signatures 706 and 708 of a material for temperatures of approximately 900 degrees and 700 degrees, respectively. The y-axis shown is the spectral radiant density with units of W/(nm*m^2) and the x-axis shown is the wavelength with unit of nm. In some embodiments, a processing unit of an opto-analytical device (e.g., opto-analytical device illustrated in FIG. 3) of temperature sensor 700 may be configured to determine and store the temperature as a function of time in a computer-readable medium to allow for retrieval of the data at a later time. In the same or alternative embodiments, the processing unit 308 may be configured to transmit the temperature measurements during drilling operations via any suitable MWD system.

The amount of wear of cutting elements 128 may be based on a variety of factors including cutting force, cutting speed and cutting element temperature. Additionally, as cutting element 128 wears, it may be less effective at cutting into a formation such that the temperature of the cutting element 128 may increase. Further, as drilling conditions change (e.g., the formation changes), the efficacy of cutting element 128 may also change such that the temperature of the cutting element 128 changes. Accordingly, temperature sensor 700 may be used to determine any number of drilling characteristics based on the temperature of one or more cutting elements 128. Additionally, processing the signal of temperature sensor 700 may yield an acoustic signature of a formation, which may be used in determining a formation type and/or wear conditions of cutting elements 128.

Figure 7C:
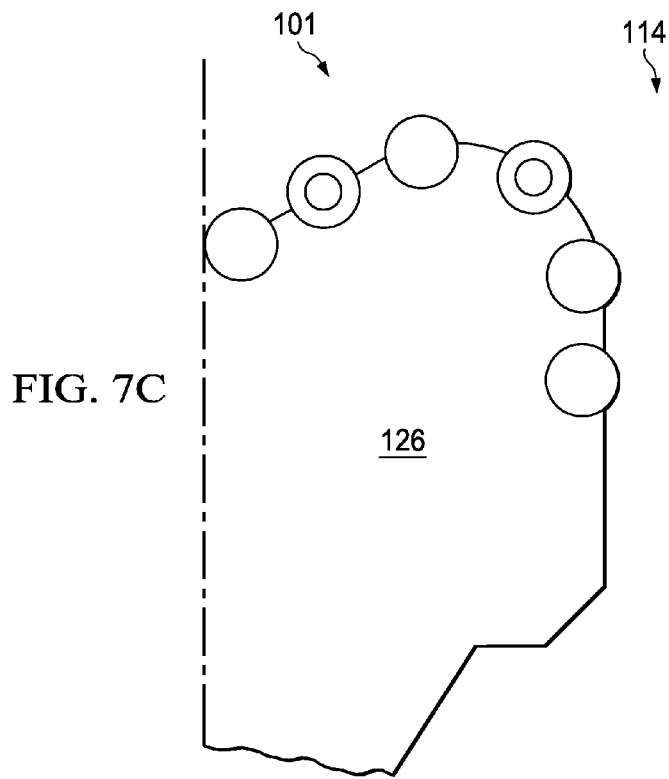
FIG. 7C illustrates an example configuration of temperature sensors with cutting elements to determine one or more drilling characteristics based on the temperature of cutting elements in accordance with some embodiments of the present disclosure.

FIG. 7C illustrates an example configuration of temperature sensors 700 integrated with cutting elements 128 and configured to indicate one or more drilling characteristics based on the temperature of cutting elements 128. In the illustrated embodiment cutting element 128*b*, which is on a cone portion of blade 126 of drill bit 101, may include a temperature sensor 700*a* integrated therein, such as shown with respect to FIG. 7A. Cutting element 128*d*, which is located within a nose portion of blade 126, may include temperature sensor 700*b* integrated therein. Temperature sensors 700*a* and 700*b* may be configured to measure the temperatures of cutting elements 128*b* and 128*d*, respectively. In some embodiments, temperature sensors 700*a* and 700*b* may be configured to store the temperatures as a function of time in a computer-readable medium, such that the measurements may be retrieved at a later time. In other embodiments, the measurements may be communicated to the well site using any suitable MWD system.

Figure 7D:
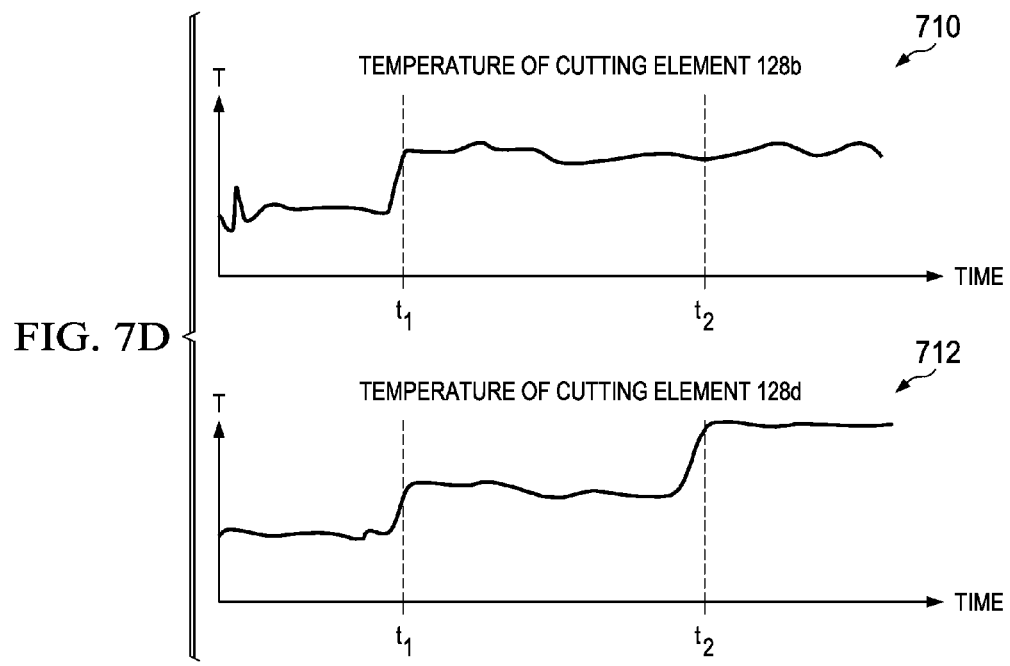
FIG. 7D illustrates example plots and of the temperatures of cutting elements as a function of time, in accordance with some embodiments of the present disclosure.

The temperature measurements of cutting elements 128*b* and 128*d* over time may indicate one or more drilling characteristics. FIG. 7D illustrates example plots 710 and 712 of the temperatures of cutting elements 128*b* and 128*d* as a function of time, according to some embodiments of the present disclosure. Both plots 710 and 712 show a relatively rapid increase in temperature at time $t_1$. In many drilling cases, cutting elements located on the cone portion of a blade (e.g., cutting element 128*b*) may experience little wear. Therefore, a relatively rapid increase in temperature of cutting element 128*b* at time $t_1$ may indicate that a drilling condition has changed (e.g., the formation hardness has increased). Additionally, the increase in temperature at time $t_1$ of both cutting elements 128*b* and 128*d* may indicate that the increase in temperature may be caused by a change in drilling conditions.

However, plot 712 shows an increase in temperature of cutting element 128*d* at time $t_2$ while plot 710 does not show an increase in temperature of cutting element 128*b* at time $t_2$. Therefore, the temperature increase at time $t_2$ in plot 712 may indicate wear of cutting element 128*d* (and perhaps cutting elements 128 located near cutting element 128*d*). Similarly, the lack of a substantial temperature increase of cutting element 128*b* at time $t_2$ in plot 710 may indicate little to no wear of cutting element 128*b* (and perhaps cutting elements 128 near cutting element 128*b*). Therefore, one or more temperature sensors 700 that include opto-analytical device 300 may be integrated with a drill bit to detect one or more drilling characteristics such as cutting element wear, drilling condition changes, etc.

Based on a comparison of the temperatures of cutting elements 128b and 128d, one or more drilling factors may be modified. In some embodiments, WOB may be modified based on the comparison. For example, if the temperature of a particular cutting element increases significantly, this cutting element may be subjected too much force. Thus, WOB may be lowered in such a condition. As another example, if the temperature of one or more cutting elements in a nose zone of the drill bit increases, but the temperature of the cutting elements in the cone zone of the drill bit remains the same or does not increase significantly, cutting elements in the nose zone may be subjected to too much wear. Accordingly, the amount of drilling fluid may be modified based on the comparison. For example, a high temperature at both cutting elements may indicate the need for additional drilling fluid for lubricant. Accordingly, more drilling fluid may be added. As another example, drilling may be slowed or stopped if high bit temperatures are sensed in order to avoid certain types of gases escaping to the surface of the drilling site. As yet another example, drilling may be stopped in order to service or otherwise perform maintenance on the drill bit.

Modifications, additions, or omissions may be made to FIGS. 7A-7D without departing from the scope of the present disclosure. For example, the particular placement and configuration of temperature sensors 700 depicted in FIGS. 7A-7D is for illustrative purposes only. The placement, number, and configuration of temperature sensors 700 may vary depending on the application. Additionally, temperature sensor 700 may be used to determine the temperature of any number of objects associated with drilling (e.g., the formation, the drilling fluid, other components of a drill bit, drilling tool or the drill string) and is not limited to determining the temperature of a cutting element 128. Furthermore, opto-analytical device 300 of temperature sensor 700 may be configured to detect any number of other drilling characteristics (e.g., chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like) while also determining temperature measurements.

Figure 8:
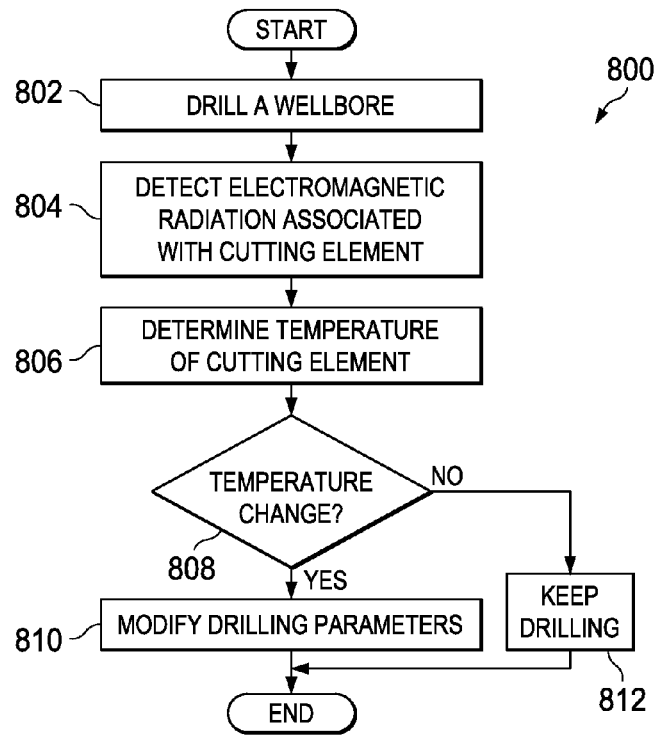
FIG. 8 illustrates an example method for determining one or more drilling characteristics based on temperature in accordance with some embodiments of the present disclosure.

FIG. 8 illustrates an example method 800 for determining one or more drilling characteristics based on temperature, in accordance with some embodiments of the present disclosure. Method 800 may be performed by any suitable system, apparatus, or device. In the illustrated embodiment, method 800 may be performed using a drill bit 101 configured with a temperature sensor 700 as described with respect to FIGS. 7A-7D. However, method 800 may be performed using any suitable drilling tool configured to analyze cuttings created by the drilling tool.

Method 800 may start and at step 802 drill bit 101 may form a wellbore by drilling into a geological formation. At step 804, electromagnetic radiation associated with heat of a cutting element 128 may be received by channel 702 associated with a temperature sensor 700, as described above with respect to FIG. 7A. At step 806, temperature sensor 700 may detect and determine the temperature of the cutting element 128 using an opto-analytical device 300 included in temperature sensor 700, as described above with respect to FIGS. 7A-7D. In some embodiments, temperature sensor 700 may be configured to store the temperature of the cutting element 128 as a function of time in a computer readable medium, or may be configured to transmit the temperature of the cutting element 128 as a function of time uphole via a MWD system.

At step 808, temperature sensor 700 determines whether there has been a change in temperature. If a temperature change has been detected at step 808, the method moves to step 810, where one or more drilling parameters may be modified based on the detected change in temperature. For instance, if a temperature increase is detected, it may indicate that the input mechanical energy to the bit is too high and either RPM or WOB may be reduced. A higher temperature associated with cutting elements may also indicate that the cuttings created on bottom may not be properly cleared and drilling fluid density and/or speed at which drilling fluid is introduced may be adjusted. If drilling in a high pressure and high temperature formation, measurement of temperature becomes even more important. As another example, a change in temperature may indicate a transition from one formation type to another, which may require one or more parameters (e.g. amount/composition/flow rate of drilling fluid, power applied to drill bit 101, RPM, WOB, etc.) to be modified for optimum drilling of the new formation type. Further, as explained above with respect to FIGS. 7C and 7D, an increase in temperature may indicate wear of one or more cutting elements 128. Accordingly, the drill bit 101 may be replaced or modified in response. For instance, the design or configuration of cutting elements 128 may be modified based on the temperature measurements of one or more cutting elements 128 during drilling to improve the efficacy of the cutting elements. In addition, the temperature of one or more cutting elements 128 during drilling may also be used to validate or invalidate the arrangement of nozzles 156 on a bit body. For example, if the temperature of a cutting element in the cone zone is higher than that of a cutting element in the nose or gage zones, then the orientation of one or more nozzles in the cone zone may be adjusted or the number of nozzles may be increased to provide an improved flow pattern for the drilling fluid over the cutting elements in the cone zone. If no temperature change is detected at step 808, however, the method moves to step 812 where drilling continues without any modification to drilling parameters.

Modifications, additions, or omissions may be made to method 800 without departing from the scope of the present disclosure. For example, any number of other drilling characteristics (e.g., chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like) may be determined while also determining temperature measurements of cutting elements 128. In addition, temperature measurements may be taken from any portion of the drilling tool and/or formation, in addition to or in lieu of cutting elements 128. Further, other opto-analytical devices 300 may analyze properties of cutting element 128 other than temperature, while the temperature of the cutting element is being monitored.

Figure 9:
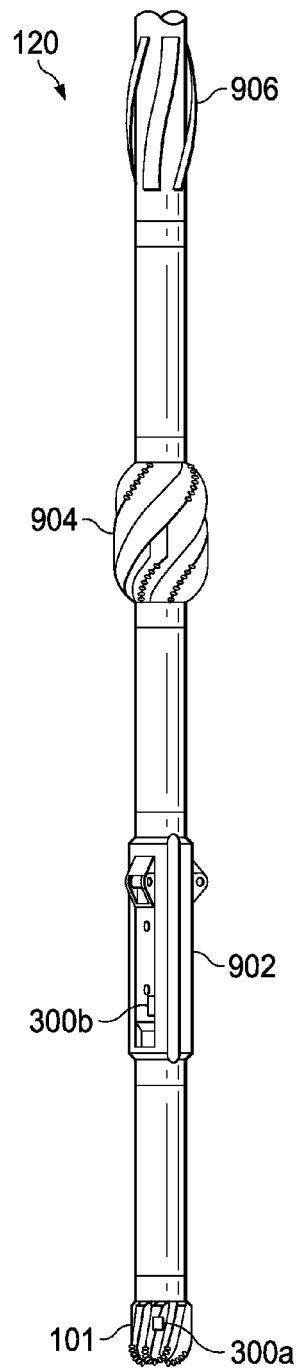
FIG. 9 illustrates and example configuration of a bottom hole assembly including opto-analytical devices configured to determine torsion of the drilling tool in accordance with some embodiments of the present disclosure.

An opto-analytical device 300 may also be configured to determine torsion (also known as windup) of a drill string. FIG. 9 illustrates an example configuration of BHA 120 including opto-analytical devices 300*a* and 300*b* configured to determine torsion of the drill string associated with BHA 120. In some embodiments, a processing unit of opto-analytical device 300 may be configured to determine and store the amount of torsion as a function of time in a computer-readable medium to allow for retrieval of the data at a later time. In the same or alternative embodiments, processing unit 308 may be configured to transmit the torsion determinations during drilling operations via any suitable MWD system.

The torsion or windup of the drilling tool may be measured by recognizing changes in rotational velocity of the drill bit, and by matching up reamer data to determine the amount of torque present in the drill strip. The combination of tool phase and a real time composition/porosity map can be used to locate the position of the drilling tool in the formation. Opto-analytical device 300 may sense an identifiable feature in the formation as the tool rotates thereby providing an extremely accurate measurement of rotational velocity of the bit. In some embodiments, the identifiable feature in the formation may be a line or gouge running vertically on the wellbore, and may be naturally occurring or may be placed in the wellbore by a drilling operator. In other embodiments, the identifiable feature in the formation may be some compositional change in the formation such as fracture plane or bedding plane. By measuring the amount of time between detections of the identifiable feature, an operator can see the bit speed up or slow down, such as for instance, in response to various formation conditions encountered. Assuming constant power to the tool, a slow down in rotational velocity may indicate a harder rock, and thus increased torque on the bit and torsion of the drilling tool.

In certain embodiments, two or more opto-analytical devices 300 may be separated by a distance along the vertical length of the drilling tool, allowing the detection of a radial offset between the two sensors. This offset may be determined based on the detections of the identifiable feature in the formation described above. Alternatively, the offset may be determined based on the position of the two sensors with respect to one or more points on the drilling tool. Based on the determined offset, the distance between the sensors, the material properties of the tool, cross sectional dimensions of the wellbore, or other factors, the amount of torsion in the drilling tool may be determined. Since there are dynamic and physical limits to the amount of torsion that can be tolerated in a drilling system, drilling may then be slowed or stopped when high amounts of torsion are detected, thereby avoiding any negative consequences such as torsional locking of the bit (i.e., sticking in the formation), sudden releases of the torsional energy in the drill, unwinding of the pipe joint, tearing of the drill pipe, etc.

Modifications, additions, or omissions may be made to FIG. 9 without departing from the scope of the present disclosure. For example, the illustrated embodiment depicts drill bit 101 and reamer 902 integrated with opto-analytical devices 300*a* and 300*b*, respectively, to determine torsion of the drilling tool. However, any combination of drill bit 101, reamer 902, hole enlarger 904 and/or stabilizer 906 (or any other suitable drilling tool) may include one or more opto-analytical devices 300 to determine torsion. Furthermore, opto-analytical device 300 may be configured to detect any number of other drilling characteristics (e.g., chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like) while also determining torsion.

Figure 10:
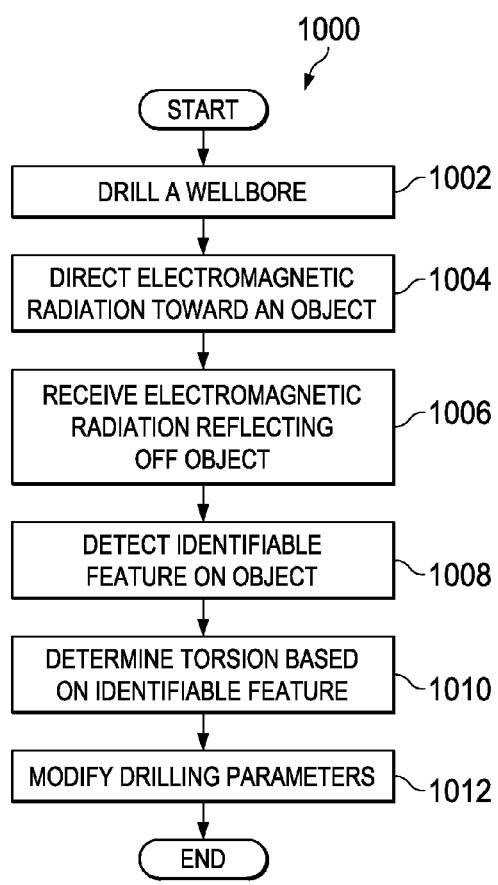
FIG. 10 illustrates an example method for determining torsion of a drilling tool in accordance with some embodiments of the present disclosure.

FIG. 10 illustrates an example method 1000 for determining torsion of a drilling tool in accordance with some embodiments of the present disclosure. Method 1000 may be performed by any suitable, system, apparatus, or device. In the illustrated embodiment, method 1000 may be performed using opto-analytical device 300 described with respect to FIG. 9.

Method 1000 may start and at step 1002, drill bit 101 may form a wellbore by drilling into a geological formation. The method proceeds to step 1004, where opto-analytical device 300 directs electromagnetic radiation toward an object (e.g., the wall of a wellbore 114). At step 1006, opto-analytical device 300 mounted on a drilling tool (e.g. a drill bit, a reamer, a stabilizer, a hole enlarger, etc.) receives electromagnetic radiation reflected from a wellbore. Then, at step 1008, opto-analytical device 300 detects an identifiable feature in the object. For instance, the identifiable feature in the object may be a line or gouge running vertically on the wellbore, and may be naturally occurring or placed in the wellbore by a drilling operator. In other embodiments, the identifiable feature in the formation may be some compositional change in the formation such as fracture plane or bedding plane. In particular embodiments, the identifiable feature may be detected based on the detection of a deviation in the electromagnetic radiation received at a point in time, and may include peaks/spikes or valleys/dips in the amount of radiation being received at a particular point in time.

At step 1010, opto-analytical device 300 determines a torsion in the drilling tool. This may be accomplished, for example, by determining a velocity of the drill bit over time based on the period of the deviations detected in the received electromagnetic radiation. This will provide an observed velocity over time. Based on changes in the velocity over time, the opto-analytical device may determine an amount of torsion in the drill bit at step 1010. As another example, two or more opto-analytical devices 300 may be separated by a distance along the vertical length of the drilling tool, allowing the detection of a radial offset between the two sensors, as described above. Based on the determined offset, the distance between the sensors, the material properties of the tool, the cross sectional dimensions of the wellbore, and/or other factors, the amount of torsion in the drilling tool may be determined. This may assist the operator in determining, for example, whether the drill bit is twisting or turning in the wellbore, and may allow the operator to make one or more modifications at step 1012. For instance, the operator may increase or reduce the amount of power to the drill tool, add or remove WOB, add or remove drilling fluid, change the chemistry of the drilling fluid, or stop the drilling entirely based on the determined amount of torsion.

Modifications, additions, or omissions may be made to FIG. 10 without departing from the scope of the present disclosure. For example, any number of other drilling characteristics (e.g., chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like) may be determined while also determining torsion.

Figure 11:
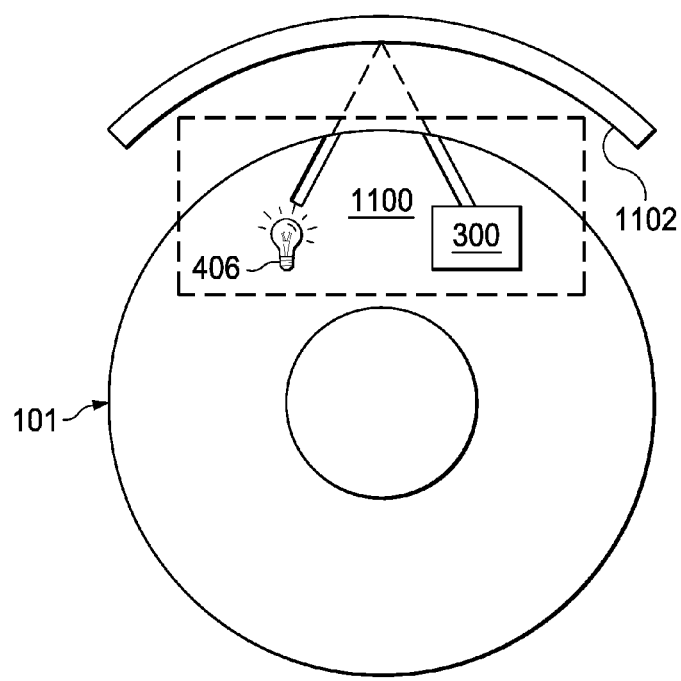
FIG. 11 illustrates an example embodiment of a gap sensor in accordance with some embodiments of the present disclosure.

Another performance indicator of a drilling tool that may be measured by opto-analytical device 300 may be the distance or gap between, for example, an object on the drilling tool (e.g., a cutting element, an impact arrestor, a nozzle, a blade, the bit body, etc) and another object in the wellbore (e.g., the side wall of the wellbore). In some embodiments, the gap between an object on the drill bit and an object in the wellbore may indicate bit whirl, bit walk, worn cutting elements, vibration of a bit, and/or tilt of a bit. As such, it may be advantageous to monitor the gap between the object on the drill bit and the object in the wellbore to determine if bit whirl (i.e., movements of the bit away from its rotational axis), bit walk (i.e., the lateral movement of the bit as drilling progresses over time), worn cutting elements, vibration of a bit, and/or tilt of a bit is present. FIG. 11 illustrates an example embodiment of a gap sensor 1100 configured to determine the gap between objects using an opto-analytical device 300, according to some embodiments of the present disclosure.

Gap sensor 1100 may include electromagnetic radiation source 406 configured to direct electromagnetic radiation toward object 1102 (e.g., a wall of a wellbore, drilling fluid cake, etc.) such that the electromagnetic radiation reflects off of object 1102 toward opto-analytical device 300. Gap sensor 1100 may be located in one or more channels of drill bit 101, in one or more windows 401 of drill bit, on one or more cutting elements 128 of drill bit 101, on one or more DOCCs 129 of drill bit 101, on one or more blades 126 of drill bit 101, in one or more nozzles 156 of drill bit 101, in fluid flow paths 240 of drill bit 101, on shank 152 of drill bit 101, a reamer, a stabilizer, or any other similar location for determining the gap between drill bit 101 and object 1102. Processing unit 308 of opto-analytical device 300 of FIG. 11 may be configured to determine the distance between the object and gap sensor 1100 based on reflected electromagnetic radiation from object 1102. Because the intensity of the reflected electromagnetic radiation received is based in large part by the inverse square law of light, the distance may be determined based on the ratio of the respective intensities of the electromagnetic radiation directed toward object 1102 and the electromagnetic radiation reflected back from object 1102. Alternatively, in other embodiments, the gap may be determined when detector 306 of opto-analytical device 300 includes a split detector, quad detector, array detector, or imaging device. In such embodiments, the gap may be encoded in the electromagnetic radiation detected by the various detector sub-elements, and may be determined through certain signal processing techniques. For example, in some embodiments, the optical train can be configured so that the gap is related to difference between sub-elements while the characteristic signal is obtained from the sum of the sub elements. In other embodiments, the gap signal may be derived from a more complex relationship between the subelements (e.g., in a quad detector, subelement 1 plus subelement 2 minus subelement 3 minus subelement 4) in parallel with detection of the characteristic signal which in general is obtained by the sum of the sub-element signals.

Processing unit 308 of opto-analytical device 300 of gap sensor 1100 may be configured to store the gap measurements as a function of time in a computer-readable storage medium such that the gap measurements may be retrieved at a later time after drill bit 101 has been removed from a wellbore (e.g., wellbore 114 as illustrated in FIG. 1). In the same or alternative embodiments, processing unit 308 may be configured to transmit the gap measurements to the well site while drill bit 101 is in the wellbore via any suitable MWD system.

The gap as measured by gap sensor 1100 may be used to determine any number of drilling characteristics. For example, one or more gap sensors 1100 may be used to determine bit motion, including, but not limited to, bit whirl, bit walk and bit tilt. Additionally, one or more gap sensors 1100 may be used to determine the depth of cut of cutting elements and/or wear of cutting elements. For example, three or more gap sensors may be mounted circumferentially on a drill bit to estimate the diameter of the hole drilled by the drill bit. An oversized hole may be due to bit wear, downhole vibration, and/or unexpected tilt angle of downhole motor. Likewise, a change in the symmetry of the hole may raise issues for future drilling activities such as laying casing in the hole or for changing drilling direction. In addition, the determined gap may be used to calculate the volume of the hole, which is a vital calculation for drilling operation design. Such calculations are used, for example, in determining drilling fluid circulation volume and cementing operation parameters.

Modifications, additions, or omissions may be made to gap sensor 1100 without departing from the scope of the present disclosure. For example, opto-analytical device 300 of gap sensor 1100 may be configured to detect any number of other drilling characteristics (e.g., chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like) while also determining gap measurements.

Figure 12A:
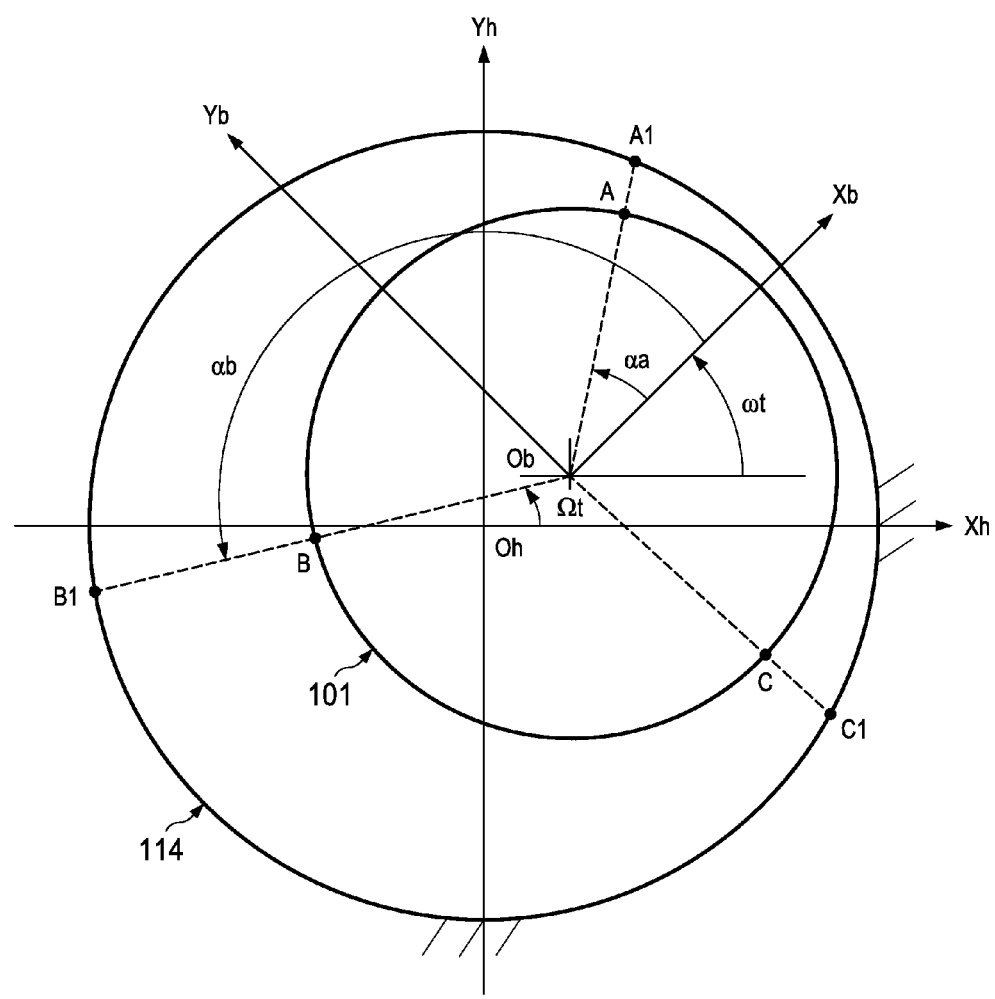
FIGS. 12A-12C illustrate an example of bit whirl of a drill bit in a wellbore, in accordance with some embodiments of the present disclosure.
Figure 12B:
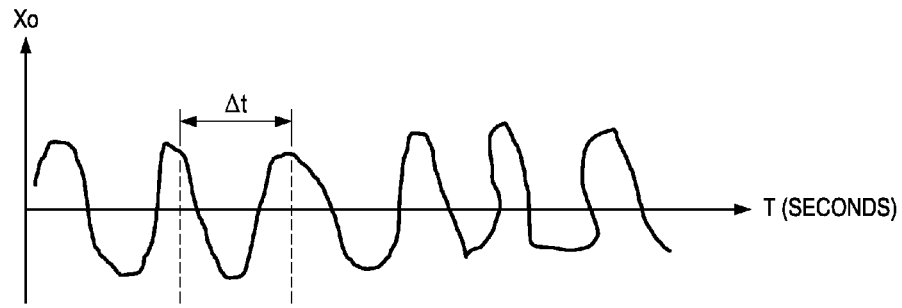
Figure 12C:
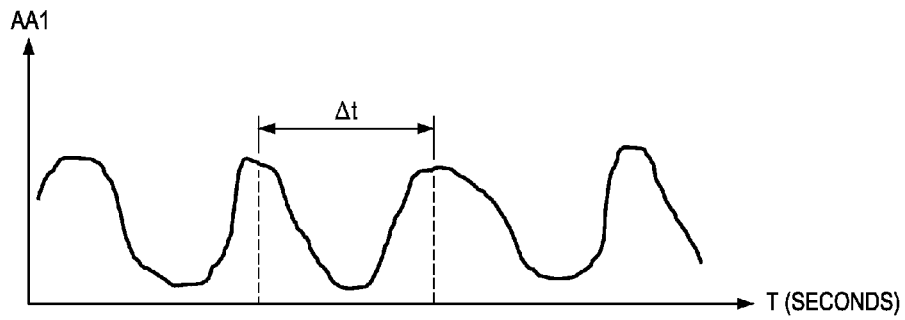

Gap sensors 1100 may be configured to determine the bit whirl and bit walk of a drill bit in a wellbore. FIGS. 12A-12C illustrate an example of bit whirl of drill bit 101 in wellbore 114, according to some embodiments of the present disclosure. In FIG. 12A, drill bit 101 may rotate around its center (Ob) at an angular radian frequency ($\omega$). Additionally, in some instances, bit center Ob may whirl around the center of wellbore 114 (Oh) at a whirl radian frequency ($\Omega$). The radius of the bit whirl ($\Delta R$) may be expressed as the distance between the drill bit center (Ob) and the wellbore center (Oh). Points A, B and C, of drill bit 101 may be points on the bit body of drill bit 101 (e.g., on the gage pad of drill bit 101) and points A1, B1, and C1 may points on the wall of wellbore 114 at a time t that correspond with points A, B, and C, respectively. In the present embodiment, drill bit 101 may include gap sensor 1100 at each of points A, B, and C to determine the gap between points A and A1 (AA1), points B and B1 (BB1) and points C and C1 (CC1) respectively.

The coordinates of points A1, B1, and C1 in a Cartesian coordinate system with an x-axis (Xb) and a y-axis (Yb) intersecting at the center of drill bit 101 (Ob) may be expressed by the following equations:

$$X_{A1}=(Rb+AA1)\cos(\alpha a),\ Y_{A1}=(Rb+AA1)\sin(\alpha a);$$

$$X_{B1}=(Rb+BB1)\cos(\alpha b),\ Y_{B1}=(Rb+BB1)\sin(\alpha b);$$

$$X_{C1}=(Rb+CC1)\cos(\alpha c),\ Y_{C1}=(Rb+CC1)\sin(\alpha c);$$

Where Rb is the radius of drill bit 101 and $\alpha a$, $\alpha b$ and $\alpha c$ are the angles of points A, B, and C with respect to axis Xb ($\alpha a$ and $\alpha b$ are expressly shown in FIG. 12).

If it is assumed that wellbore 114 is substantially circular, then the coordinates of points of A1($X_{A1}$, $Y_{A1}$), B1($X_{B1}$, $Y_{B1}$) and C1($X_{C1}$, $Y_{C1}$) obtained above may be located on the circle. The center coordinates (Xo, Yo) and the radius Rh of the circle may be determined by solving the following equations:

$$\begin{vmatrix} 2XA1 & 2YA1 & -1 \\ 2XB1 & 2YB1 & -1 \\ 2XC1 & 2YC1 & -1 \end{vmatrix} \begin{Bmatrix} Xo \\ Yo \\ q \end{Bmatrix} = \begin{Bmatrix} XA1^2 + YA1^2 \\ XB1^2 + YB1^2 \\ XC1^2 + YC1^2 \end{Bmatrix}$$

Where the hole radius Rh may be expressed as:

$$Rh = \sqrt{Xo^2 + Yo^2 - q}$$

and the whirl radius may be expressed as:

$$\Delta R = \sqrt{Xo^2 + Yo^2}$$

Additionally, the whirl frequency of drill bit 101 may be obtained by plotting the trajectory of the center of drill bit 101 in the XY plane of a coordinate system with an x-axis (Xh) and y-axis (Yh) intersecting at the center of wellbore 114 (Oh) at time t where: the x-coordinate of Ob with respect to Xh equals Xo(t) and the y-coordinate of Ob with respect to Yh equals Yo(t). The value of Xo(t) and Yo(t) may be obtained by solving the above equation at time instant t.

FIG. 12B illustrates an example plot of Xo of the center of drill bit 101 (Ob) with respect to time. The whirl frequency ($\Omega$) may be determined based on the period ($\Delta t$) of the wave of the plot of FIG. 12B as expressed by the equations below.

$$\Omega \Delta t = 2\pi \text{ or } \Omega = \frac{2\pi}{\Delta t}$$

The whirl frequency ($\Omega$) of drill bit 101 may also be determined by performing a Fast Fourier Transform (FFT) on either Xo(t) or Yo(t).

The bit angular rotational frequency ($\Omega$) may be obtained by plotting the distance of AA1 (or BB1 or CC1) as a function of time. FIG. 12C illustrates an example plot of AA1 as a function of time. In FIG. 12C, the bit angular rotational frequency ($\omega$) may be determined based on the period ($\Delta t$) of the wave of the plot of FIG. 12C as expressed by the equations below.

$$\omega \Delta t = 2\pi \text{ or } \omega = \frac{2\pi}{\Delta t}$$

Performing an FFT on either AA1(t) or BB1(t) or CC1(t) may also result in obtaining the bit rotational frequency ($\omega$) of drill bit 101.

Accordingly, a plurality of gap sensors 1100 including opto-analytical devices 300 may be configured to determine and record the whirl of drill bit 101 in accordance with some embodiments of the present disclosure. The whirl of drill bit 101 as measured and determined using gap sensors 1100 may be used to improve the design of drill bit 101 to decrease whirl. For example, several anti-whirl technologies, including low-friction pads (as described in U.S. Pat. No. 4,932,484 and hereby incorporated by reference in its entirety), and track-loc cutter arrangement (as described in U.S. Pat. No. 5,265,685 and hereby incorporated by reference in its entirety) may be used to avoid bit whirl. If whirl is detected during drilling, an operator may decrease bit rotational speed and/or increase weight on bit in order to avoid whirl. Additionally, as mentioned above, opto-analytical devices 300 of gap sensors 1100 may be configured to detect, determine and record any number of other drilling characteristics such as properties of the formation being drilled (e.g., chemical composition, rock strength, plasticity, porosity, etc.) Therefore, in some embodiments, formation characteristics may be correlated with the detected amount of bit whirl to determine which formations may cause the most or least whirl of drill bit 101.

Figure 12D:
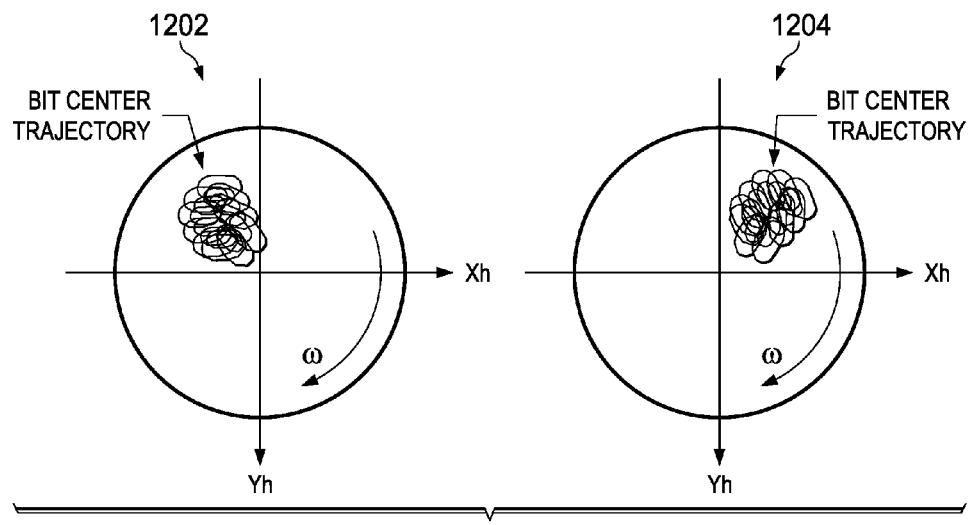
FIG. 12D illustrates example plots of points that indicate the bit walk of two drill bits in accordance with some embodiments of the present disclosure.

Additionally, the trajectory of the center of drill bit 101 (Ob) in the XhYh plane may be determined by plotting the x and y coordinates of Ob at different times t in the XhYh plane (Xo(t) and Yo(t), respectively). The locations of the points ((Xo(ti), Yo(ti)) in the XhYh plane may accordingly indicate bit walk of drill bit 101. FIG. 12D illustrates example plots 1202 and 1204 of points ((Xo(ti), Yo(ti)) that indicate the bit walk of two drill bits 101. Plot 1202 indicates a trajectory of the center of the associated drill bit 101 that is up and to the left, thus, indicating that the associated drill bit 101 may walk up and to the left with respect to the XhYh plane. In contrast, plot 1204 indicates a trajectory of the center of the associated drill bit that is up and to the right, thus, indicating that the associated drill bit 101 may walk up and to the right, with respect to the XhYh plane. Plots 1202 and 1204 are merely examples of bit walk and a drill bit 101 may walk in any number of directions.

Accordingly, a plurality of gap sensors 1100 including opto-analytical devices 300 may be configured to determine and record the bit walk of a drill bit 101 in accordance with some embodiments of the present disclosure. The bit walk of the drill bit 101 as measured and determined using gap sensors 1100 may be used to improve the design of drill bit 101 to decrease the walk of drill bit 101. For example, if gap sensors 1100 determine that the bit walks left, a deep cone profile may be needed to reduce the walk left tendency. Additionally, a small gauge pad may help to reduce bit walk left. Conversely, if gap sensors 1100 determine that the bit walks right, a shallower cone profile and/or a larger gage pad may be needed to reduce the walk right tendency. Furthermore, the bit walk of the drill bit 101 as measured and determined using gap sensors 1100 may be used to guide the rotary steerable system to change drilling azimuth direction to follow the desired drilling path. Additionally, as mentioned above, the opto-analytical devices 300 of gap sensors 1100 may be configured to detect, determine and record any number of other drilling characteristics such as properties of the formation being drilled (e.g., chemical composition, rock strength, plasticity, porosity, etc.) Therefore, in some embodiments, formation properties may be correlated with bit tilt to determine which formations may cause the most or least bit walk of drill bit 101.

Modifications, additions, or omissions may be made to FIGS. 12A-12D without departing from the scope of the present disclosure. For example, the coordinate systems used and their respective orientations are for illustrative purposes only, any suitable coordinate system may be used. Additionally, the equations used to determine bit whirl and bit walk using the gap between a drill bit and wall of a wellbore are for illustrative purposes and any other suitable equation or expression may be used to determine bit whirl and bit walk. Additionally, as mentioned above, the opto-analytical devices of gap sensors may be configured to detect any number of other drilling characteristics (e.g., chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like) while also being used to determine bit walk and/or bit whirl. Accordingly, bit walk and/or bit whirl may be correlated with other properties of the formation being drilled into.

Figure 13A:
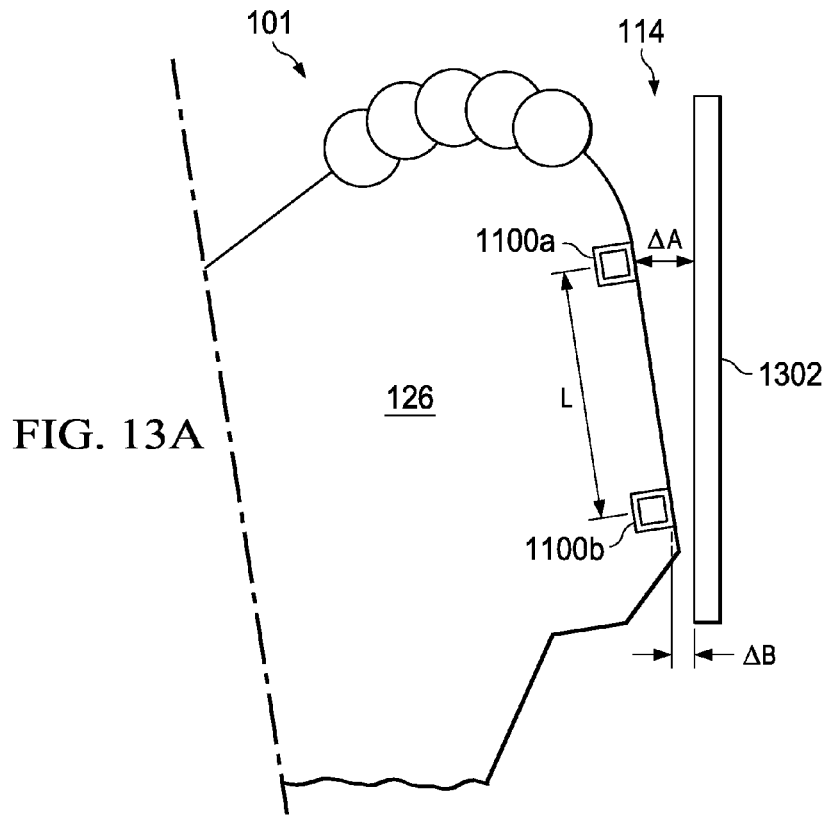
FIG. 13A illustrates a cross-sectional view of an example configuration of a drill bit including gap sensors in accordance with some embodiments of the present disclosure.

Gap sensors 1100 may also be configured to determine the tilt and tilting motion of drill bit 101 in wellbore 114. FIG. 13A illustrates a cross-sectional view of an example configuration of drill bit 101 including gap sensors 1100a and 1100b configured such that tilt and tilting motion of drill bit 101 may be determined, according to some embodiments of the present disclosure. In the illustrated embodiment, gap sensors 1100a and 1100b may be placed at different elevations (with respect to the rotational axis of drill bit 101) on a gage pad of blade 126 of drill bit 101.

Gap sensors 1100a and 1100b may be configured to determine the distance between the gage pad at their respective locations and wall 1302 of wellbore 114. The distance between gap sensors 1100a and 1100b and wall 1302 are indicated as $\Delta A$ and $\Delta B$, respectively, in FIG. 13A. The difference between the values of $\Delta A$ and $\Delta B$ represent the amount of tilt of drill bit 101 with respect to wall 1302 of wellbore 114. For example, the tilt angle of drill bit 101 at a given time t may be determined based on the difference between $\Delta A$ and $\Delta B$ at that time t and the distance between gap sensors 1100a and 1100b with respect to the rotational axis of drill bit 101 (L), as indicated by the expression below:

$$\beta = a\tan((\Delta A - \Delta B)/L)$$

Figure 13B:
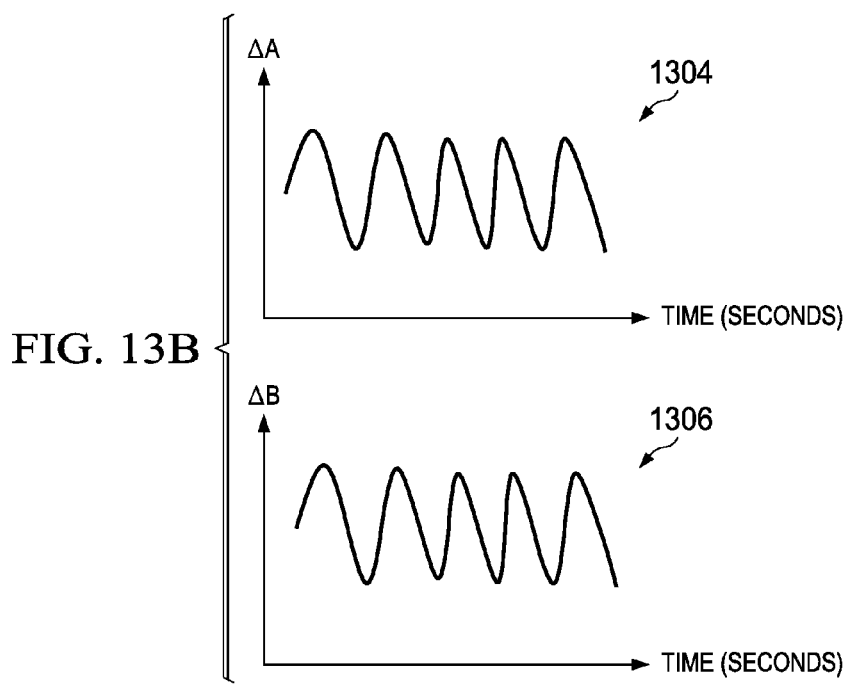
FIG. 13B illustrates example plots of gaps between a drill bit and a wellbore over time in accordance with some embodiments of the present disclosure.

Plots of $\Delta A$ and $\Delta B$ with respect to time may also indicate the tilting motion of drill bit 101. FIG. 13B illustrates example plots 1304 and 1306 of $\Delta A$ and $\Delta B$, respectively, with respect to time.

Accordingly, a plurality of gap sensors 1100 including opto-analytical devices 300 may be configured to determine and record the bit tilt of drill bit 101 in accordance with some embodiments of the present disclosure. The bit tilt of drill bit 101 as measured and determined using gap sensors 1100 may be used to improve the design of drill bit 101 to decrease the interaction between gage pad and the wall of wellbore 114 to improve drilling efficiency. In other embodiments, such as directional drilling, where the tilt may indicate a desired change in direction of drill bit 101, the bit tilt may indicate the degree in which drill bit 101 is changing direction. Therefore, modifications may be made to drill bit 101 and/or the associated steering mechanism based on the tilt data to improve the steerability of drill bit 101 during directional drilling. Additionally, as mentioned above, opto-analytical devices 300 of gap sensors 1100 may be configured to detect, determine and record any number of other drilling characteristics such as properties of the formation being drilled (e.g., chemical composition, rock strength, plasticity, porosity, etc.) Therefore, in some embodiments, formation properties may be correlated with bit tilt to determine which formations may cause the most or least tilt of drill bit 101.

Modifications, additions, or omissions may be made to FIGS. 13A and 13B without departing from the scope of the present disclosure. For example the actual location and configuration of gap sensors 1100a and 1100b on a drill bit 101 may vary. In addition, the number of gap sensors 1100 of a drill bit 101 configured to determine the tilt of drill bit 101 may vary. Furthermore, although the above description is given with respect to a drill bit 101, gap sensors 1100 may be configured to determine the tilt of any other drilling tool, as applicable. Additionally, opto-analytical device 300 of gap sensor 1100 may be configured to detect any number of other drilling characteristics (e.g., chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like) while also determining tilt of a drill bit.

Figure 14:
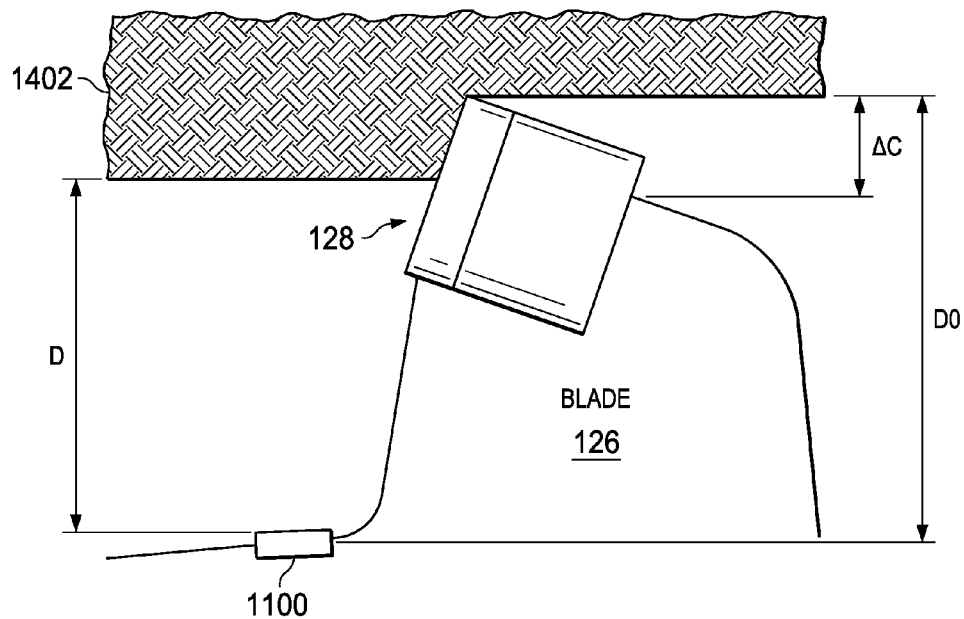
FIG. 14 illustrates an example configuration of a drill bit including a gap sensor configured to detect the depth of cut of a cutting element in accordance with some embodiments of the present disclosure.

Another performance indicator of a drilling tool that may be measured by opto-analytical device 300 may be the depth of cut of a cutting element in a formation. In some embodiments, a decreased gap between a portion of a blade 126 and the formation may indicate wear or decreased rate of penetration (ROP) into the formation. As such, it may be advantageous to monitor the gap between a blade 126 and the formation to determine if cutting elements are worn or if ROP has changed, and possibly modify the drilling parameters (e.g., power to the tool, WOB, RPM, etc.) to achieve optimal ROP. A gap sensor 1100 may also be configured to determine the depth of cut of a cutting element in a formation. FIG. 14 illustrates an example configuration of drill bit 101 including gap sensor 1100 configured to detect the depth of cut of a cutting element 128, according to some embodiments of the present disclosure. In the illustrated embodiment, gap sensor 1100 may be placed at the base of blade 126 that includes cutting element 128. Gap sensor 1100 may be placed in front of cutting element 128 in the direction of rotation of drill bit 101 and may be configured to measure the distance (parallel to the rotational axis of drill bit 101) between the base of blade 126 and formation 1402 (illustrated as distance D). The distance (parallel to the rotational axis of drill bit 101) between gap sensor 1100 and the tip of cutting element 128 (illustrated as distance D0 in FIG. 14) may be a known parameter of drill bit 101.

The depth of cut of the cutting element 128 ($\Delta c$) may be determined by taking the difference between D and $D_0$ as expressed by the following equation:

$$\Delta c = D_0 - D$$

In some embodiments, a processing unit of an opto-analytical device (e.g., opto-analytical device illustrated in FIG. 3) of gap sensor 1100 may be configured to determine the depth of cut and store the depth of cut as a function of time in a computer-readable medium to allow for retrieval of the data at a later time. In the same or alternative embodiments, the processing unit 308 may be configured to transmit the depth of cut determinations during drilling operations via any suitable MWD system. Additionally, in some embodiments, the processing unit may be configured to determine, store and/or transmit the distance D and the depth of cut may be determined using any other suitable, system, apparatus or device based on the measured D and known D0.

The depth of cut may be used to determine other drilling characteristics. For example, the ROP of drill bit 101 may be related to the depth of cut of cutting elements 128 and the revolutions per minute (RPM) of the drill bit 101 as expressed by the equation below:

ROP=5*RPM*Δc

Accordingly, one or more gap sensors 1100 including opto-analytical devices 300 may be configured to determine and record the depth of cut of one or more cutting elements 128 of drill bit 101 in accordance with some embodiments of the present disclosure. The depth of cut of cutting elements 128 as measured and determined using gap sensors 1100 may also be used to improve the design of drill bit 101 and cutting elements 128. For example, the actual depth of cut of cutting elements 128 during drilling may be used to verify the effectiveness of the DOCCs and to update the design of drill bit 101. Additionally, as mentioned above, opto-analytical device 300 of gap sensor 1100 may be configured to detect, determine and record any number of other drilling characteristics such as properties of the formation being drilled (e.g., chemical composition, rock strength, plasticity, porosity, etc.) Therefore, in some embodiments, formation properties may be correlated with depth of cut to determine how different formation properties may affect the depth of cut.

Modifications, additions, or omissions may be made to FIG. 14 without departing from the scope of the present disclosure. For example the actual location and configuration of gap sensor 1100 and cutting element 128 of FIG. 14 may vary. In addition, the number of gap sensors 1100 of a drill bit 101 each configured to determine the depth of cut of an associated cutting element 128 may vary. Furthermore, although the above description is given with respect to a drill bit 101, a gap sensor 1100 may be configured to determine the depth of cut of cutting elements of any other drilling tool. Additionally, opto-analytical device 300 of gap sensor 1100 may be configured to detect any number of other drilling characteristics (e.g., chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like) while also determining depth of cut measurements.

Figure 15:
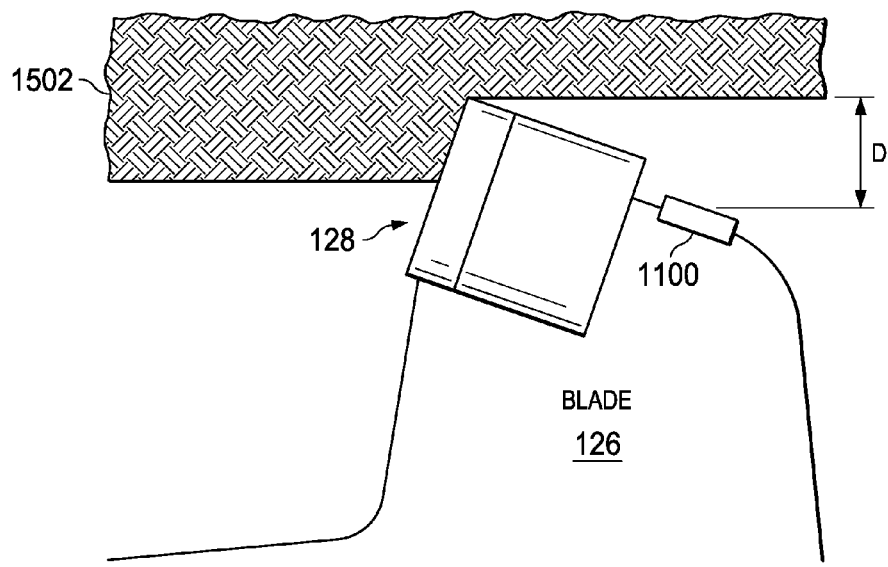
FIG. 15 illustrates an example configuration of a drill bit including a gap sensor configured to detect the wear of a cutting element in accordance with some embodiments of the present disclosure.

Another performance indicator of a drilling tool that may be measured by opto-analytical device 300 may be the wear of cutting elements 128. In some embodiments, an increase in the measured gap may indicate wear of one or more cutting elements 128. As such, it may be advantageous to monitor the gap between one or more cutting elements 128 on drill bit 101 and an object in the wellbore (e.g., the side wall of the wellbore) to determine if there is increasing wear on cutting elements 128. FIG. 15 illustrates an example configuration of a drill bit 101 including gap sensor 1100 configured to detect the wear of a cutting element 128, according to some embodiments of the present disclosure. In the illustrated embodiment, gap sensor 1100 may be disposed on the surface of blade 126 that includes cutting element 128. Gap sensor 1100 may be placed behind the cutting element 128 in the direction of rotation of drill bit 101 and may be configured to measure the distance (parallel to the rotational axis of drill bit 101) between the surface of blade 126 and formation 1502 after being cut into by the cutting element 128 (illustrated as distance D). As the cutting element 128 wears, the distance D illustrated in FIG. 15 will get smaller.

In some embodiments, a processing unit (e.g., processing unit 308 of FIG. 3) of the opto-analytical device (e.g., opto-analytical device 300 of FIG. 3) of gap sensor 1100 may be configured to determine the distance D and store the distance D as a function of time in a computer-readable medium to allow for retrieval of the data at a later time. In the same or alternative embodiments, the processing unit may be configured to transmit the distance D to the well site during drilling operations via any suitable MWD system. Therefore, an analysis of distance D may indicate wear of the cutting element 128.

Accordingly, one or more gap sensors 1100 including opto-analytical devices may be configured to detect and record data associated with the wear of one or more cutting elements 128. The wear of cutting elements 128 as determined based on the data detected and recorded by gap sensors 1100 may be used to improve the design of one or more cutting elements 128. For example, the wear of the cutting elements may be used to design and locate backup cutting elements and non-cutting elements (e.g., DOCCs, blades, etc.). The amount of wear of the cutting elements during drilling may also be an indicator of when the drill bit will need replacing. For example, based on the amount of wear over time, an operator may be able to estimate the amount of time remaining for the current drill bit, or the amount of time a future drill bit will last. Additionally, as mentioned above, an opto-analytical device of gap sensor 1100 may be configured to detect, determine and record any number of other drilling characteristics such as properties of the formation being drilled (e.g., chemical composition, rock strength, plasticity, porosity, etc.) Therefore, in some embodiments, formation properties may be correlated with cutting element wear to determine how different formation properties may affect the wear of cutting elements.

Modifications, additions, or omissions may be made to FIG. 15 without departing from the scope of the present disclosure. For example the actual location and configuration of gap sensor 1100 and cutting element 128 of FIG. 15 may vary. Further, the number of gap sensors 1100 of a drill bit 101 each configured to determine the wear of an associated cutting element 128 may vary. Further, although the above description is given with respect to drill bit 101, gap sensor 1100 may be configured to determine the wear of cutting elements of any other drilling tool.

Figure 16:
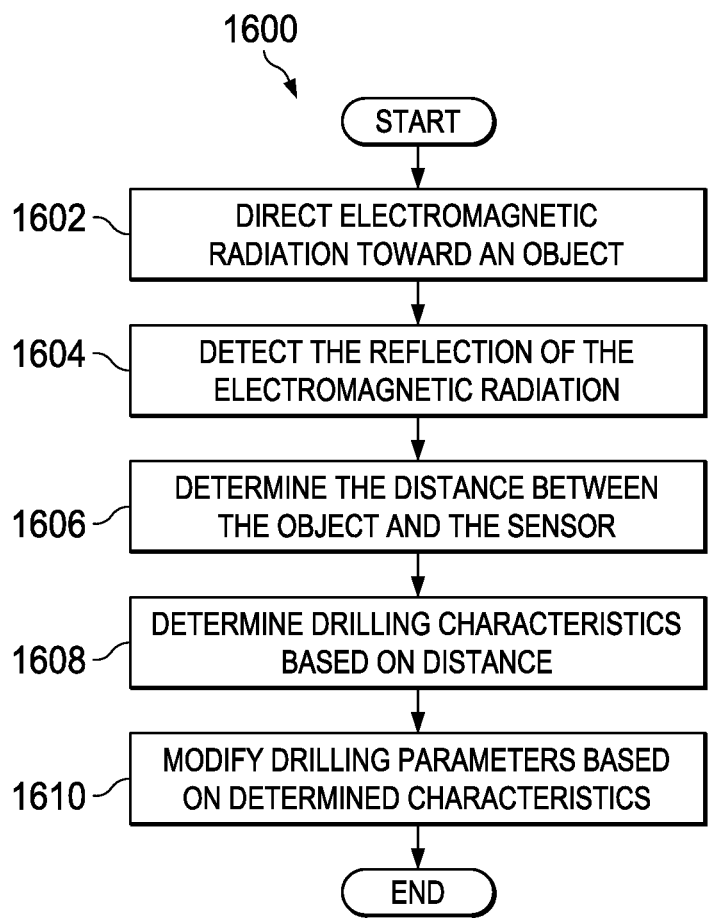
FIG. 16 illustrates a flow chart of an example method for determining a gap between objects in accordance with some embodiments of the present disclosure.

FIG. 16 illustrates a flow chart of an example method 1600 for determining a gap between objects, according to some embodiments of the present disclosure. Method 1600 may be performed by any suitable, system, apparatus, or device. In the illustrated embodiment, method 1600 may be performed using gap sensor 1100 described with respect to FIG. 11.

Method 1600 may start, and at step 1602 gap sensor 1100 mounted on a drilling tool (e.g. a drill bit 101, a reamer, a stabilizer, a hole enlarger, etc.) may direct electromagnetic radiation toward an object (e.g., the wall of a wellbore 114). At step 1604, gap sensor 1100 may detect the electromagnetic radiation that has been reflected off of an object such as the wellbore, the formation, the drill bit, or another portion of the drilling tool. At step 1606, the gap sensor 1100 may determine a distance between the object and the gap sensor 1100 based on the reflected electromagnetic radiation.

At step 1608, one or more drilling characteristics may be determined based on the distance determined at step 1606. For example, bit motion such as bit whirl, bit walk and bit tilt may be determined as described above with respect to FIGS. 12A-13B. Additionally, the depth of cut and wear of cutting elements may be determined based on the gap measurements, as described with respect to FIGS. 14 and 15, respectively. Furthermore, if at least three gap sensors are mounted circumferentially on a drill bit, the diameter of the hole drilled by the bit may be estimated. The actual hole size is usually larger than that of a drill bit, especially in directional drilling using a downhole motor. An oversized hole may be due to bit wear, downhole vibration, and/or unexpected tilt angle of a downhole motor.

At step 1610, one or more drilling parameters may be modified based on the determined drilling characteristics. For example, if bit whirl is detected during drilling, an operator may decrease bit rotational speed and/or increase weight on bit in order to avoid whirl. As another example, if the bit walks, a deeper or shallower cone profile or a larger or smaller gage pad may be needed to reduce the walk tendency. Furthermore, the drilling azimuth direction may be modified by increasing or decreasing power to the tool, WOB, RPM, etc. in order to follow the desired drilling path. Additionally, based on a detected change in the depth of cut or the diameter of the hole, a drill bit may be replaced with a new bit as the change may indicate wear of the cutting elements. Accordingly, method 1600 may use a gap sensor 1100 that includes an opto-analytical device 300 to determine one or more drilling characteristics.

Modifications, additions, or omissions may be made to method 1600 without departing from the scope of the present disclosure. For example, as mentioned above, an opto-analytical device 300 of a gap sensor 1100 may be configured to detect, determine and record any number of other drilling characteristics (e.g., chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like) while also determining gap measurements. Therefore, in some embodiments, formation properties may be correlated with drilling characteristics associated with gap measurements to determine the effect of the formation properties on the drilling characteristics associated with the gap measurements.

Figure 17A:
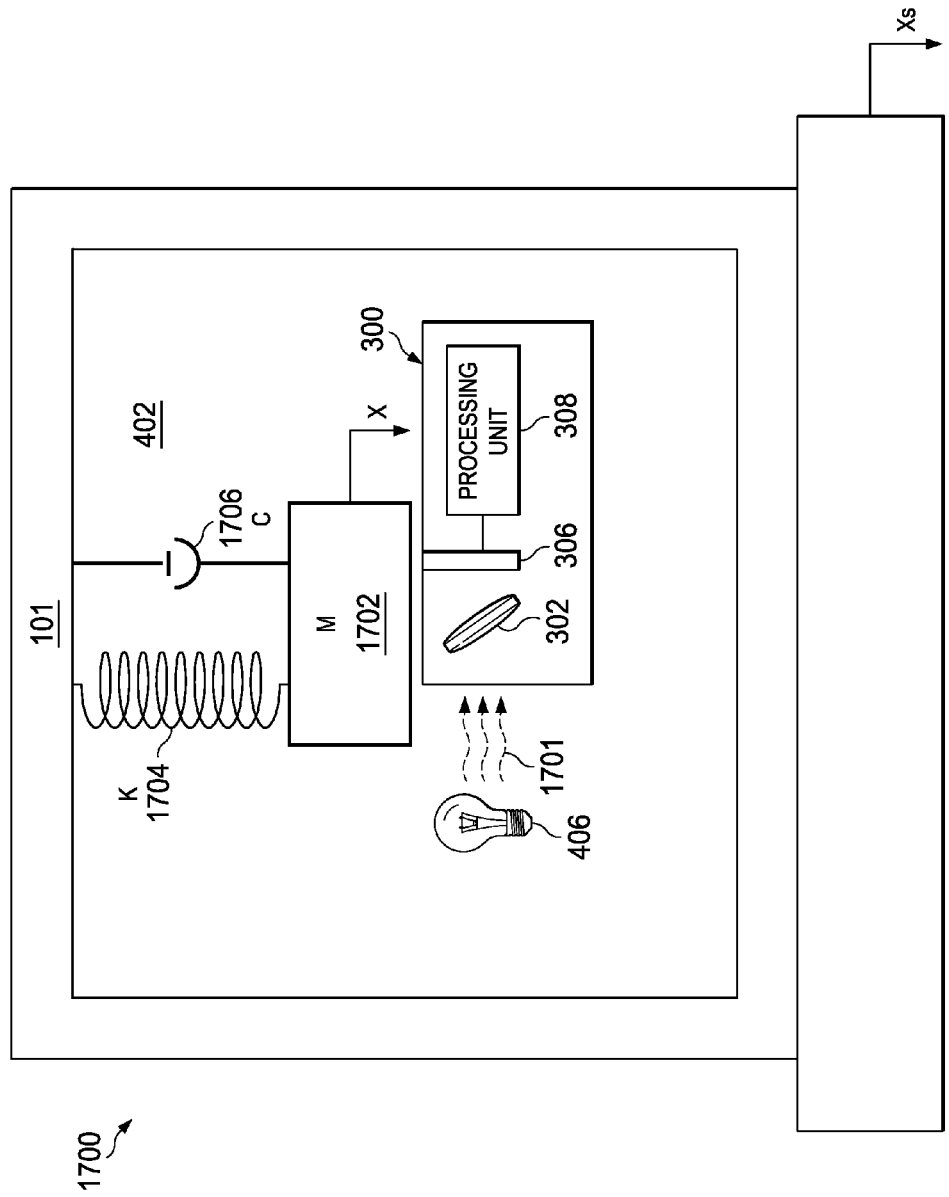
FIG. 17A illustrates an example embodiment of an accelerometer configured to determine acceleration of a drilling tool using an opto-analytical device in accordance with some embodiments of the present disclosure.

In addition to the above applications, an opto-analytical device 300 may also be used as an accelerometer to determine one or more drilling characteristics. FIG. 17A illustrates an example embodiment of an accelerometer 1700 configured to determine acceleration of a drilling tool using an opto-analytical device 300, according to some embodiments of the present disclosure. Accelerometer 1700 may be integrated with any suitable drilling tool and in the illustrated embodiment may be integrated in a cavity 402 of a drill bit 101. In some embodiments, a processing unit of opto-analytical device 300 may be configured to determine and store the acceleration of the drilling tool as a function of time in a computer-readable medium to allow for retrieval of the data at a later time. In the same or alternative embodiments, processing unit 308 may be configured to transmit the acceleration determinations during drilling operations via any suitable MWD system.

Accelerometer 1700 may include an electromagnetic radiation source 406 configured to direct electromagnetic radiation 1701 toward an opto-analytical device 300. Accelerometer 1700 may also include a mass 1702 coupled to a spring 1704 having a spring constant K and a damper 1706 having a damping coefficient C. When drill bit 101 moves (e.g., vibrates) mass 1702 may also move and block at least part of electromagnetic radiation 1701 received by an opto-analytical device 300 of FIG. 17A that includes an ICE 302, detector 306 and processing unit 308. Therefore, the intensity of electromagnetic radiation 1701 received by ICE 302 of opto-analytical device 300 may vary according to the movement of mass 1702 such that the acceleration of drill bit 101 may be determined based on the varied intensity of electromagnetic radiation 1701 received by opto-analytical device 300 of accelerometer 1700.

As will be appreciated and recognized by one of ordinary skill in the art, the motion of mass 1702 having a mass M may be described as follows:

$$M\ddot{x} + C\dot{x} + Kx = -M\ddot{x}_s$$

Figure 17B:
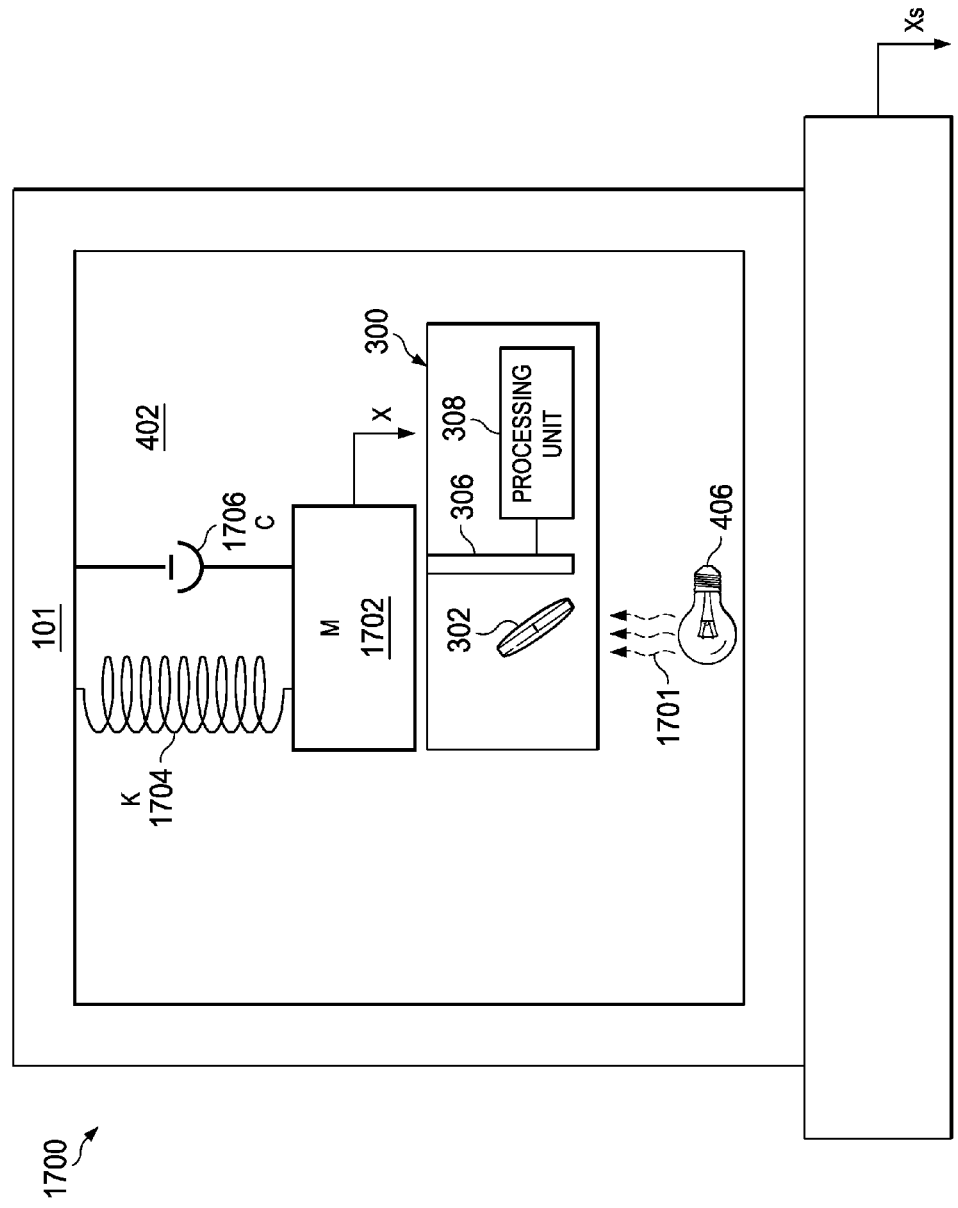
FIG. 17B illustrates another embodiment of an accelerometer configured to determine acceleration of a drilling tool using an opto-analytical device in accordance with some embodiments of the present disclosure.

If the natural frequency of accelerometer 1700 (p) as expressed by $$p = \sqrt{\frac{K}{M}}$$

is higher than the measured frequency of drill bit 101 (e.g., the vibration frequency of drill bit 101), then the measured x may be proportional to the acceleration of drill bit 101. FIG. 17B illustrates an alternative embodiment of accelerometer 1700 that uses the same principles as described with respect to FIG. 17A, according to some embodiments of the present disclosure.

Modifications, additions, or omissions may be made to FIGS. 17A and 17B without departing from the scope of the present disclosure. For example, although described with respect to a drill bit 101, accelerometer 1700 may be integrated with any suitable drilling tool. Additionally, opto-analytical device 300 of accelerometer 1700 may be configured to receive electromagnetic radiation from channels (not expressly shown) configured to direct the electromagnetic radiation from the formation being drilled into to opto-analytical device 300 of accelerometer 1700. Accordingly, opto-analytical device 300 may be configured to detect, determine and record any number of other drilling characteristics (e.g., chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like) while also determining acceleration. Therefore, in some embodiments, formation properties may be correlated with the movement and acceleration (e.g., vibration) of drill bit 101 as measured by accelerometer 1700.

Figure 18:
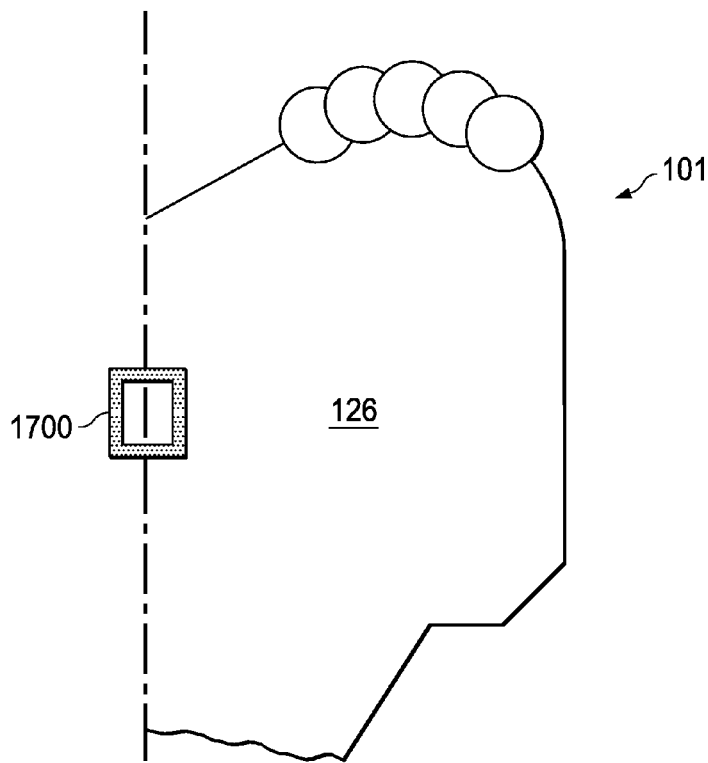
FIG. 18 illustrates an example configuration of an accelerometer integrated with a drill bit along the rotational axis of the drill bit such that accelerometer may detect axial vibration of the drill bit in accordance with some embodiments of the present disclosure.

Accelerometer 1700 may be used to determine any number of drilling characteristics. For example, FIG. 18 illustrates an example configuration of an accelerometer 1700 integrated with a drill bit 101 along the rotational axis of the drill bit 101 such that accelerometer 1700 may detect axial vibration of drill bit 101, according to some embodiments of the present disclosure. Accelerometer 1700 may also be used to detect drill bit shocks when the magnitude of acceleration is above a pre-defined level, for example, 50 g.

Modifications, additions, or omissions may be made to FIG. 18 without departing from the scope of the present disclosure. For example, although described with respect to determining axial vibration of a drill bit 101, accelerometer 1700 may be integrated with any suitable drilling tool to determine vibrations associated with that drilling tool. Further, accelerometer 1700 may be integrated at any number of locations of a drilling tool other than at or near the rotational axis to determine vibration of the drilling tool at the any number of locations. Additionally, opto-analytical device 300 of accelerometer 1700 may be configured to receive electromagnetic radiation from channels (not expressly shown) configured to direct the electromagnetic radiation from the formation being drilled into to opto-analytical device 300 of accelerometer 1700. Accordingly, opto-analytical device 300 may be configured to detect, determine and record any number of other drilling characteristics (e.g., chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like) while also determining acceleration. Therefore, in some embodiments, formation properties may be correlated with the vibration of drill bit 101 (or any other drilling tool) as measured by accelerometer 1700.

Figure 19:
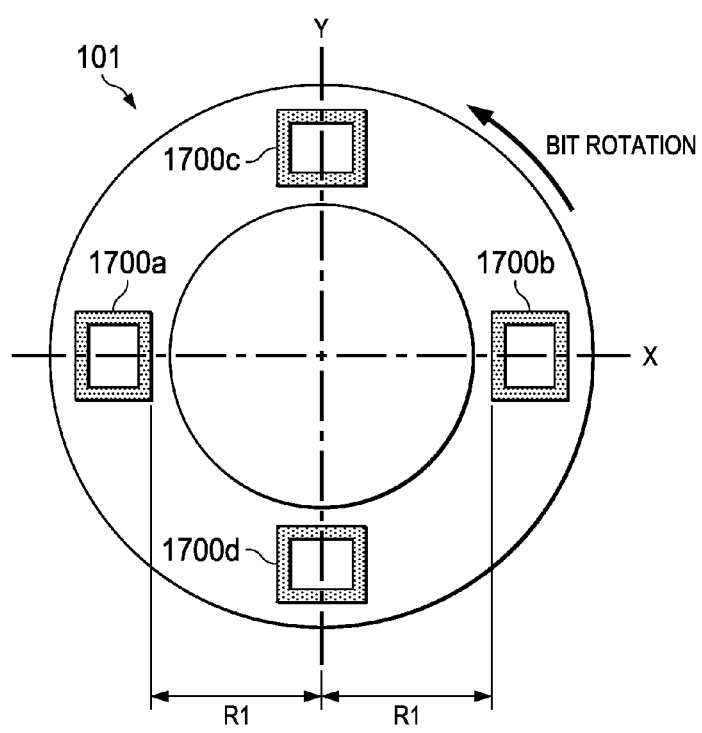
FIG. 19 illustrates an example configuration of accelerometers integrated with a drill bit to determine the rotational speed of the drill bit in accordance with some embodiments of the present disclosure.

Accelerometer 1700 may also be configured to determine the rotational speed of a drilling tool. FIG. 19 illustrates an example configuration of accelerometers 1700*a* and 1700*b* integrated with a drill bit 101 to determine the rotational speed of the drill bit 101, according to some embodiments of the present disclosure. Accelerometers 1700*a* and 1700*b* may be integrated at two opposite ends of the drill bit 101 as depicted in FIG. 19. The measured acceleration at accelerometer 1700*a* (Ax1) and accelerometer 1700*b* (Ax2) may be expressed below using the bit coordinate system (XbYb plane) of FIG. 12A:

$$Ax1 = -\Delta R \Omega^2 \cos(\omega - \Omega)t - R_1 \omega^2 \text{ and } Ax2 = -\Delta R \Omega^2 \cos(\omega - \Omega)t - R_1 \omega^2$$

and $$\omega = \sqrt{\frac{Ax2 - Ax1}{2R_1}}.$$

Where $\omega$ is the rotational speed of drill bit 101, $\Omega$ is the whirl speed of drill bit 101, $\Delta R$ is the whirl radius, and $R_1$ is the radial distance of the lateral accelerometer. The bit center acceleration of drill bit 101 in the X direction (Ax) (as indicated by the X-axis of FIG. 19) may be obtained as expressed below:

$$Ax = \frac{Ax1 + Ax2}{2} = -\Delta R \Omega^2 \cos(\omega - \Omega)t$$

Additionally, if two other accelerometers 1700 are placed on drill bit 101 opposite from each other along the Y-axis of FIG. 19 (e.g., accelerometers 1700*c* and 1700*d*) the bit center acceleration of drill bit 101 in the Y direction (Ay) (as indicated by the Y-axis of FIG. 19) may be obtained based on the acceleration as measured by accelerometer 1700*c* (Ay1) and the acceleration as measured by accelerometer 1700*d* (Ay2) as expressed below:

$$Ay = \frac{Ay1 + Ay2}{2} = -\Delta R \Omega^2 \sin(\omega - \Omega)t$$

Based on the bit center accelerations Ax and Ay, an unwrapped phase angle may be obtained for drill bit 101 as expressed below:

$$\phi(t) = \arctan\left(\frac{Ay}{Ax}\right) + \phi_0 = (\omega - \Omega)t + \phi_0$$

$$\frac{d\phi}{dt} = \omega - \Omega$$

At any time, t, unwrapped phase angle $\phi(t)$ is calculated from bit center accelerations Ax and Ay. Therefore, $(\omega - \Omega)$ may be deduced by performing a linear least square fitting on $\phi(t)$, such that when bit rotational speed $\omega$ is known, the bit whirl speed $\Omega$ may be obtained.

Accordingly, a plurality of accelerometers 1700 may be integrated with a drilling tool (e.g., a drill bit 101, a reamer, a stabilizer, a hole enlarger, etc. to determine drilling characteristics such as the whirl speed of the drilling tool). Three accelerometers 1700 may be mounted in a mutually orthogonal arrangement along the center line of a drilling tool such as drill bit, downhole motor and MWD tool. The axial and lateral accelerations may be used to measure axial and lateral shocks.

Modifications, additions, or omissions may be made to FIG. 19 without departing from the scope of the present disclosure. For example, although described with respect to determining whirl speed of a drill bit 101, accelerometer 1700 may be integrated with any suitable drilling tool to determine vibrations associated with that drilling tool. Further, accelerometer 1700 may be integrated at any number of locations of a drilling tool other than at or near the rotational axis to determine vibration of the drilling tool at the any number of locations. Additionally, opto-analytical device 300 of accelerometer 1700 may be configured to receive electromagnetic radiation from channels (not expressly shown) configured to direct the electromagnetic radiation from the formation being drilled into to opto-analytical device 300 of accelerometer 1700. Accordingly, opto-analytical device 300 may be configured to detect, determine and record any number of other drilling characteristics (e.g., chemical composition of the formation (e.g. identity and concentration in total or of individual components), formation fluid content (e.g., oil, gas, and/or brines), lithology of the formation (e.g. the concentration ratio of shale, sandstone, limestone and dolomite, the amount of sand, grain size in the formation, etc.), impurity content, pH, viscosity, density, strength, total dissolved solids, salt content, porosity, opacity, bacteria content, combinations thereof, and the like). Therefore, in some embodiments, formation properties may be correlated with the whirl speed of drill bit 101 (or any other drilling tool such as a reamer or stabilizer) as measured by accelerometers 1700.

Although the present disclosure has been described with several embodiments, various changes and modifications may be suggested to one skilled in the art. For example, although the present disclosure describes the configurations of DOCCs with respect to drill bits having specific blade configurations, the same principles may be used to reduce the imbalance forces of any suitable drilling tool according to the present disclosure. It is intended that the present disclosure encompasses such changes and modifications as fall within the scope of the appended claims.

What is claimed is:

1. A method comprising:
drilling a wellbore in a formation with a drilling tool;
receiving electromagnetic radiation using an opto-analytical device coupled to the drilling tool;
determining a velocity of the drilling tool based on the received electromagnetic radiation; and
determining torsion associated with drilling the wellbore based on the determined velocity.

2. The method of claim 1, wherein:
determining the velocity of the drilling tool based on the received electromagnetic radiation comprises:
detecting a plurality of deviations in the received electromagnetic radiation indicating an identifiable feature in the wellbore; and
determining a period between detections of the deviations in the received electromagnetic radiation; and
determining torsion associated with drilling the wellbore based on the determined velocity comprises:
determining deviations in the velocity of the drilling tool.

3. The method of claim 2, wherein the identifiable feature is a physical feature in the wellbore.

4. The method of claim 2, wherein the deviations in the received electromagnetic radiation indicating the identifiable feature in the wellbore comprise peaks in an amount of electromagnetic radiation being received by the opto-analytical device at a particular point in time.

5. The method of claim 1, wherein the opto-analytical device comprises a first sensor and a second sensor coupled to the drilling tool, each sensor displaced longitudinally along the drilling tool with respect to one another, and wherein determining torsion associated with drilling the wellbore based on the received electromagnetic radiation comprises determining an offset between the first and second sensors.

6. The method of claim 5, wherein determining the offset between the first and second sensors is based on positions of the first and second sensors with respect to an identifiable feature in the wellbore.

7. The method of claim 5, wherein determining the offset between the first and second sensors is based on positions of the first and second sensors with respect to an identifiable feature on the drilling tool.

8. A downhole drilling system comprising:
a downhole drilling tool configured to drill a wellbore in a formation with a drilling tool; and
an opto-analytical device coupled to the drilling tool configured to:
receive electromagnetic radiation;
determine a velocity of the drilling tool based on the received electromagnetic radiation; and
determine torsion associated with drilling the wellbore based on the determined velocity.

9. The system of claim 8, wherein:
to determine the velocity of the drilling tool based on the received electromagnetic radiation, the opto-analytical device is configured to:
detect a plurality of deviations in the received electromagnetic radiation indicating an identifiable feature in the wellbore; and
determine a period between detections of the deviations in the received electromagnetic radiation; and
to determine torsion associated with drilling the wellbore based on the determined velocity, the opto-analytical device is configured to:
determine deviations in the velocity of the drilling tool.

10. The system of claim 9, wherein the identifiable feature is a physical feature in the wellbore.

11. The system of claim 9, wherein the deviations in the received electromagnetic radiation indicating the identifiable feature in the wellbore comprise peaks in an amount of electromagnetic radiation being received by the opto-analytical device at a particular point in time.

12. The system of claim 8, wherein the opto-analytical device comprises a first sensor and a second sensor coupled to the drilling tool, each sensor displaced longitudinally along the drilling tool with respect to one another, and wherein determining torsion associated with drilling the wellbore based on the received electromagnetic radiation comprises determining an offset between the first and second sensors.

13. The system of claim 12, wherein determining the offset between the first and second sensors is based on positions of the first and second sensors with respect to an identifiable feature in the wellbore.

14. The system of claim 12, wherein determining the offset between the first and second sensors is based on positions of the first and second sensors with respect to an identifiable feature on the drilling tool.

15. A drill bit comprising:
a bit body;
a rotational axis about which the bit body rotates;
a plurality of blades disposed on the bit body to create a bit face;
an opto-analytical device integrated with the bit body, the opto-analytical device configured to:
receive electromagnetic radiation;
determine a velocity of the drill bit based on the received electromagnetic radiation; and
determine torsion associated with drilling a wellbore based on the determined velocity.

16. The drill bit of claim 15, wherein:
to determine the velocity of the drill bit based on the received electromagnetic radiation, the opto-analytical device is configured to:
detect a plurality of deviations in the received electromagnetic radiation indicating an identifiable feature in the wellbore; and
determine a period between detections of the deviations in the received electromagnetic radiation; and
to determine torsion associated with drilling the wellbore based on the determined velocity, the opto-analytical device is configured to:
determine deviations in the velocity of the drill bit.

17. The drill bit of claim 16, wherein the identifiable feature is a physical feature in the wellbore.

18. The drill bit of claim 16, wherein the deviations in the received electromagnetic radiation indicating an identifiable feature in the wellbore comprise peaks in an amount of electromagnetic radiation being received by the opto-analytical device at a particular point in time.

19. The drill bit of claim 15, wherein the opto-analytical device comprises a first sensor and a second sensor coupled to the drill bit, each sensor displaced longitudinally along the drill bit with respect to one another, and wherein determining torsion associated with drilling the wellbore based on the received electromagnetic radiation comprises determining an offset between the first and second sensors.

20. The drill bit of claim 19, wherein determining the offset between the first and second sensors is based on positions of the first and second sensors with respect to an identifiable feature in the wellbore.

21. The drill bit of claim 19, wherein determining the offset between the first and second sensors is based on positions of the first and second sensors with respect to an identifiable feature on the drill bit.

* * * * *